(12) United States Patent
Liu et al.

(10) Patent No.: US 12,153,992 B2
(45) Date of Patent: Nov. 26, 2024

(54) ALLOCATION OF ANTENNAS FOR ENERGY HARVESTING OR DATA COMMUNICATION

(71) Applicant: QUALCOMM Incorporated, San Diego, CA (US)

(72) Inventors: Kangqi Liu, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/184,932

(22) Filed: Mar. 16, 2023

(65) Prior Publication Data

US 2024/0311592 A1 Sep. 19, 2024

(51) Int. Cl.
*G06K 7/10* (2006.01)

(52) U.S. Cl.
CPC ................................ *G06K 7/10366* (2013.01)

(58) Field of Classification Search
CPC .................................................. G06K 7/10366
USPC ............................................................ 235/451
See application file for complete search history.

(56) References Cited

U.S. PATENT DOCUMENTS

| 6,275,737 B1 * | 8/2001 | Mann ................. A61N 1/37235 607/61 |
| 2014/0292090 A1 * | 10/2014 | Cordeiro ................. H02J 50/40 307/104 |
| 2021/0167638 A1 * | 6/2021 | Yahagi ................... H02J 50/40 |

* cited by examiner

*Primary Examiner* — Daniel A Hess
(74) *Attorney, Agent, or Firm* — Harrity & Harrity, LLP

(57) ABSTRACT

Various aspects of the present disclosure generally relate to wireless communication. In some aspects, a user equipment (UE) may allocate, for at least a period of time, one or more first antennas for energy harvesting from a transmission. The UE may allocate, for at least the period of time, one or more second antennas for data communication. Numerous other aspects are described.

29 Claims, 12 Drawing Sheets

ALLOCATION OF ANTENNAS FOR ENERGY HARVESTING OR DATA COMMUNICATION

FIELD OF THE DISCLOSURE

Aspects of the present disclosure generally relate to wireless communication and to techniques and apparatuses for allocation of antennas for energy harvesting or data communication.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

One aspect provides a method for wireless communication by a user equipment (UE). The method includes allocating, for at least a period of time, one or more first antennas for energy harvesting from a transmission. The method includes allocating, for at least the period of time, one or more second antennas for data communication.

Another aspect provides a method for wireless communication by a network entity. The method includes outputting a configuration for at least one of a first allocation of one or more first antennas of a UE for energy harvesting from a transmission or a second allocation of one or more second antennas of the UE for data communication, wherein the one or more first antennas are allocated, for at least a period of time, for the energy harvesting, and the one or more second antennas are allocated, for at least the period of time, for the data communication. The method includes outputting the transmission.

Other aspects provide: an apparatus operable, configured, or otherwise adapted to perform any one or more of the aforementioned methods and/or those described herein with reference to and as illustrated by the drawings and specification; a non-transitory, computer-readable medium comprising computer-executable instructions that, when executed by a processor of an apparatus, cause the apparatus to perform the aforementioned methods and/or those described herein with reference to and as illustrated by the drawings and specification; a computer program product embodied on a computer-readable storage medium comprising code for performing the aforementioned methods and/or those described herein with reference to and as illustrated by the drawings and specification; and/or an apparatus comprising means for performing the aforementioned methods and/or those described herein with reference to and as illustrated by the drawings and specification. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
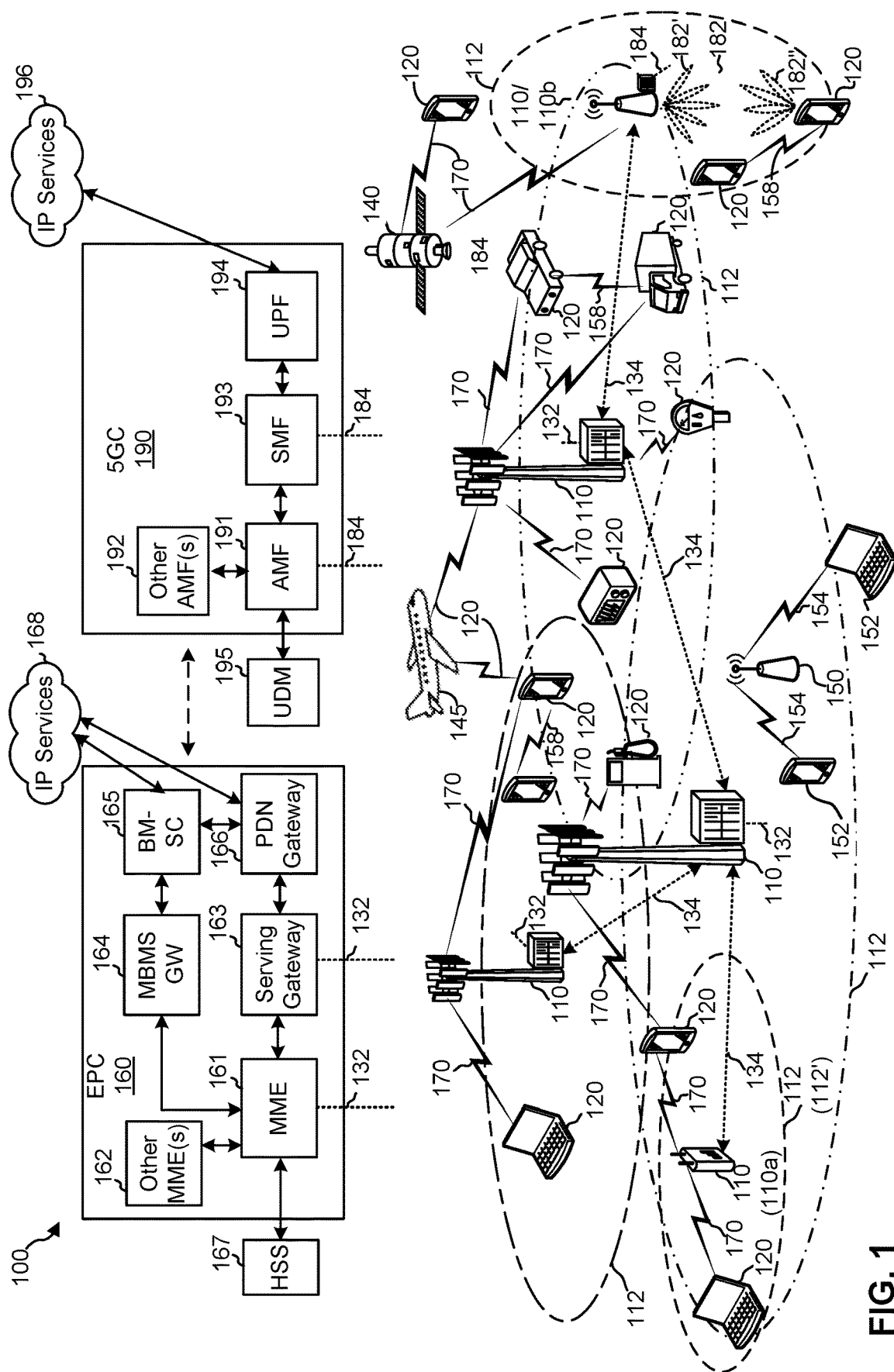
FIG. 1 depicts an example of a wireless communications network, in accordance with the present disclosure.

Aspects of the present disclosure provide apparatuses, methods, processing systems, and computer-readable mediums for allocation of antennas for energy harvesting or data communication.

A passive user equipment (UE) may be a terminal (e.g., a radio frequency identification (RFID) device, a tag, or a similar device) that may employ a simplified hardware design that does not include a battery, such that the passive UE relies on energy harvesting for power, and that does not include a radio wave generation circuit, such that the passive UE is capable of transmitting information only by reflecting a radio wave. More particularly, the passive UE may communicate with a reader (e.g., a UE, a network entity, or another network device) by modulating a reflecting radio signal from a radio frequency (RF) source (e.g., a network entity, a UE, or another network device).

Upon receiving a radio signal from an RF source, a passive UE may absorb, from the radio signal, power for the energy harvesting and power for the reflecting (e.g., for data communication). The sum of the power for the energy harvesting and the power for the reflecting may be equal to the power received by the passive UE via the radio signal. As a result, there may be a tradeoff between the energy harvested by the passive UE and the signal-to-noise ratio (SNR) of the data received by the reader. For example, when the power for the energy harvesting increases, the power for the reflecting decreases (e.g., resulting in a decrease in the SNR of the data received by the reader); and when the power for the reflecting increases, the power for the energy harvesting decreases. This tradeoff can cause the passive UE to turn off, for example, when a target SNR of the data received by the reader prompts the passive UE to increase the power for the reflecting such that the passive UE is unable to harvest sufficient energy to remain in an operational state. Other UEs, such as energy-harvesting-enabled UEs, may also experience a similar tradeoff and turn off as a result.

Some techniques provided herein enable a UE (e.g., a passive UE, an energy-harvesting-enabled UE, or the like) to allocate one or more first antennas for energy harvesting and one or more second antennas for reflecting a radio signal. The first antenna(s) and the second antenna(s) may be allocated for an overlapping period of time (e.g., may be allocated simultaneously). In some examples, a network entity, such as a base station (BS), may configure the UE to allocate the first antenna(s) and/or the second antenna(s).

Allocating the antennas for an overlapping period of time may enable a UE to manage the tradeoff between the amount of energy harvested and the quality of data communications (e.g., the SNR of the data received by the reader). For example, if the UE is losing energy and on pace to turn off, then the UE may allocate more antennas for energy harvesting, which may enable the UE to remain operational. Or, if the UE has sufficient energy to remain operational for a given quantity of time, then the UE may allocate more antennas for the reflecting, which may increase communications efficiency. In some examples, allocating the antennas between the energy harvesting and the reflecting, and/or configuring the allocations, may enable dynamic control of the performance of energy harvesting efficiency and/or energy-consumption-to-harvesting ratio (ECHR) at the UE.

In some examples, the UE may use an initial quantity of antenna(s) allocated for the reflecting. The initial quantity of antenna(s) allocated for the reflecting may enable the UE, once the UE has harvested sufficient energy to perform the reflecting, to carry out the reflecting with any suitable number of antennas.

In some examples, the UE may transmit, and the reader and/or RF source may receive, information relating to a maximum quantity of antennas that can be allocated for the reflecting. The information relating to the maximum quantity of antennas that can be allocated for the reflecting may inform the reader and/or the RF source of the allocation capabilities of the UE. In some examples, the reader and/or RF source may transmit, and the UE may receive, an indication of a configured quantity of antennas to be allocated for the reflecting. The indication of the configured quantity of antennas to be allocated for the reflecting may enable the reader and/or the RF source to dynamically maximize the efficiency of the harvested energy and the data communications (e.g., reflections). For example, the RF source may configure the UE to allocate a quantity of antennas for the reflecting that is less than the maximum quantity of antennas that can be allocated for the reflecting.

In some examples, the antennas that are allocated for the reflecting may be one set of a plurality of sets of antennas that may be selected for allocation for the reflecting. Selecting the antennas as a set may allow the reader and/or the RF source to select a set of antennas that may improve (e.g., maximize) the SNR of the data received by the reader. The set of antennas selected may also or alternatively increase diversity gain.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a UE, a BS, a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/actuator, a display, an internet of things (IoT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110a may have a coverage area 112' that overlaps the coverage area 112 of a macro cell). A BS 110 may, for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
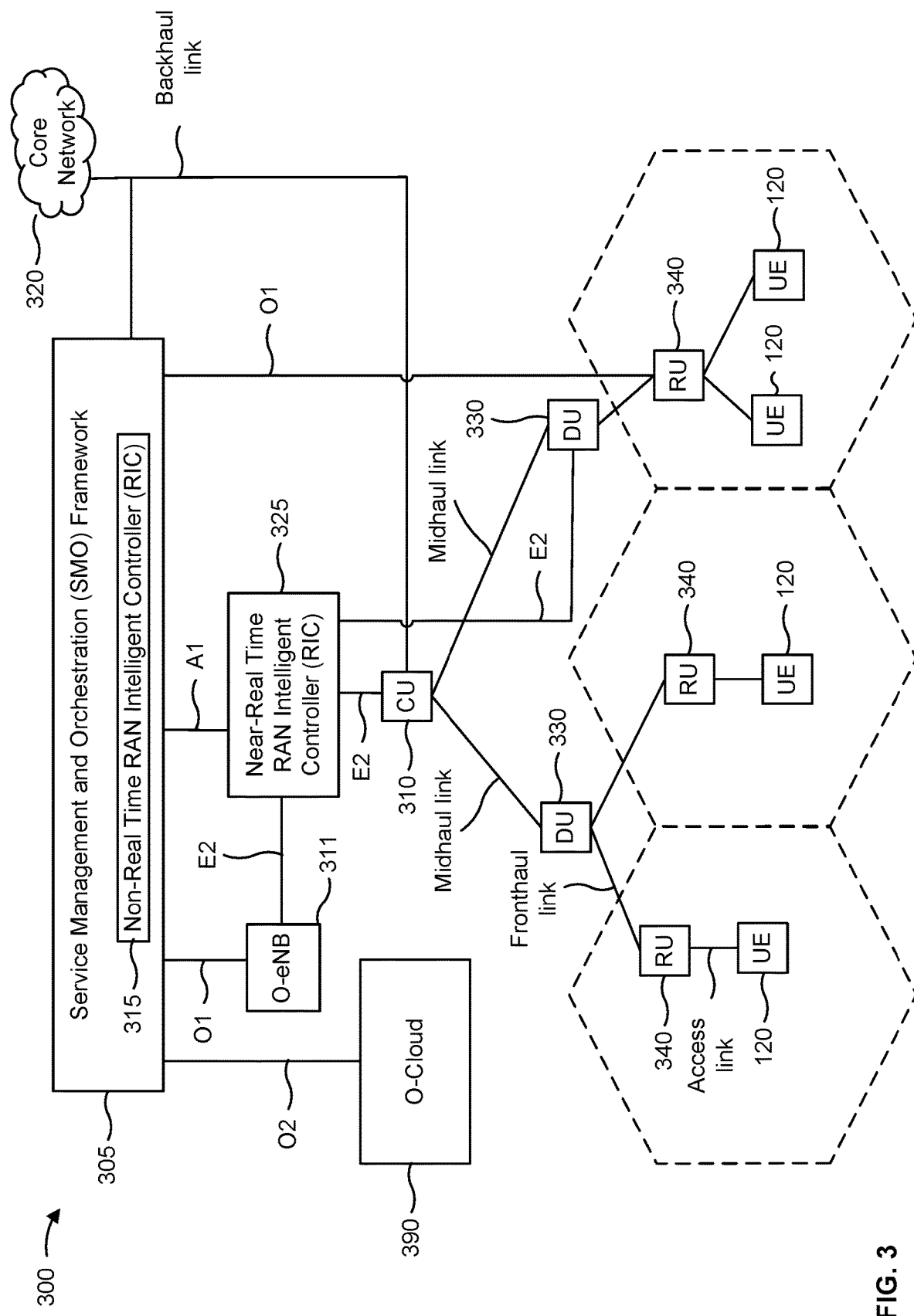
FIG. 3 depicts an example disaggregated BS architecture, in accordance with the present disclosure.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT) radio access network (RAN) Intelligent Controller (RIC), or a Non-Real Time (Non-RT) RIC, to name a few examples. In another example, various aspects of a base station may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as having a disaggregated radio access network architecture, such as an Open RAN (O-RAN) architecture or a Virtualized RAN (VRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface).

BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave or near mmWave radio frequency bands (e.g., a mmWave base station such as BS 110b) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHz, 20 MHz, 100 MHz, 400 MHz, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110b in FIG. 1) may utilize beamforming with a UE 120 to improve path loss and range, as shown at 182. For example, BS 110b and the UE 120 may each include a plurality of antennas, such as antenna elements, antenna panels, and/or antenna arrays to facilitate the beamforming. In some cases, BS 110b may transmit a beamformed signal to UE 120 in one or more transmit directions 182'. UE 120 may receive the beamformed signal from the BS 110b in one or more receive directions 182". UE 120 may also transmit a beamformed signal to the BS 110b in one or more transmit directions 182". BS 110b may also receive the beamformed signal from UE 120 in one or more receive directions 182'. BS 110b and UE 120 may then perform beam training to determine the best receive and transmit directions for each of BS 110b and UE 120. Notably, the transmit and receive directions for BS 110b may or may not be the same. Similarly, the transmit and receive directions for UE 120 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QoS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a transmission reception point (TRP), or a combination thereof, to name a few examples.

As indicated above, FIG. 1 is provided as an example. Other examples may differ from what is described with regard to FIG. 1.

Figure 2:
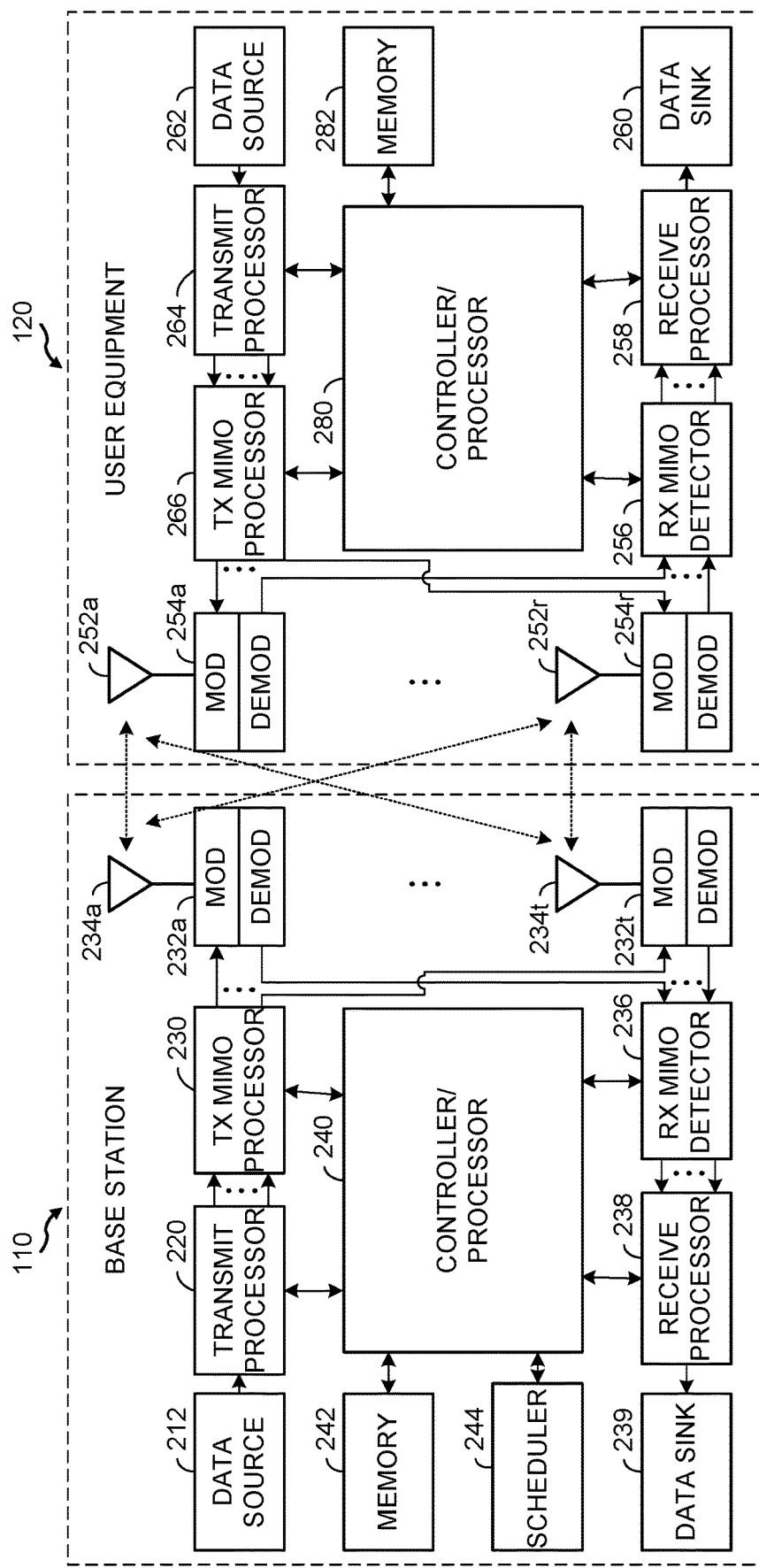
FIG. 2 depicts aspects of an example base station (BS) and user equipment (UE), in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252a-r (collectively 252), transceivers 254a-r (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the physical downlink control channel (PDCCH), the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) MIMO processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

UE 120 includes antennas 252a-252r that may receive the downlink signals from the BS 110 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the physical UL shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for single-carrier frequency division multiplexing (SC-FDM)), and transmitted to BS 110.

At BS 110, the uplink signals from UE 120 may be received by antennas 234a-234t, processed by the demodulators in transceivers 232a-232t, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting" may refer to various mechanisms of outputting data, such as outputting data from data source 212, scheduler 244, memory 242, transmit processor 220, controller/processor 240, TX MIMO processor 230, transceivers 232a-t, antenna 234a-t, and/or other aspects described herein. Similarly, "receiving" may refer to various mechanisms of obtaining data, such as obtaining data from antennas 234a-t, transceivers 232a-t, receive (RX) MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254a-t, antenna 252a-t, and/or other aspects described herein. Similarly, "receiving" may refer to various mechanisms of obtaining data, such as obtaining data from antennas 252a-t, transceivers 254a-t, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an eNB, an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an O-RAN (such as the network configuration sponsored by the O-RAN Alliance), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture. The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more RF access links. In some implementations, the UE 120 may be simultaneously served by multiple RUs 340.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit—User Plane (CU-UP)), control plane functionality (e.g., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
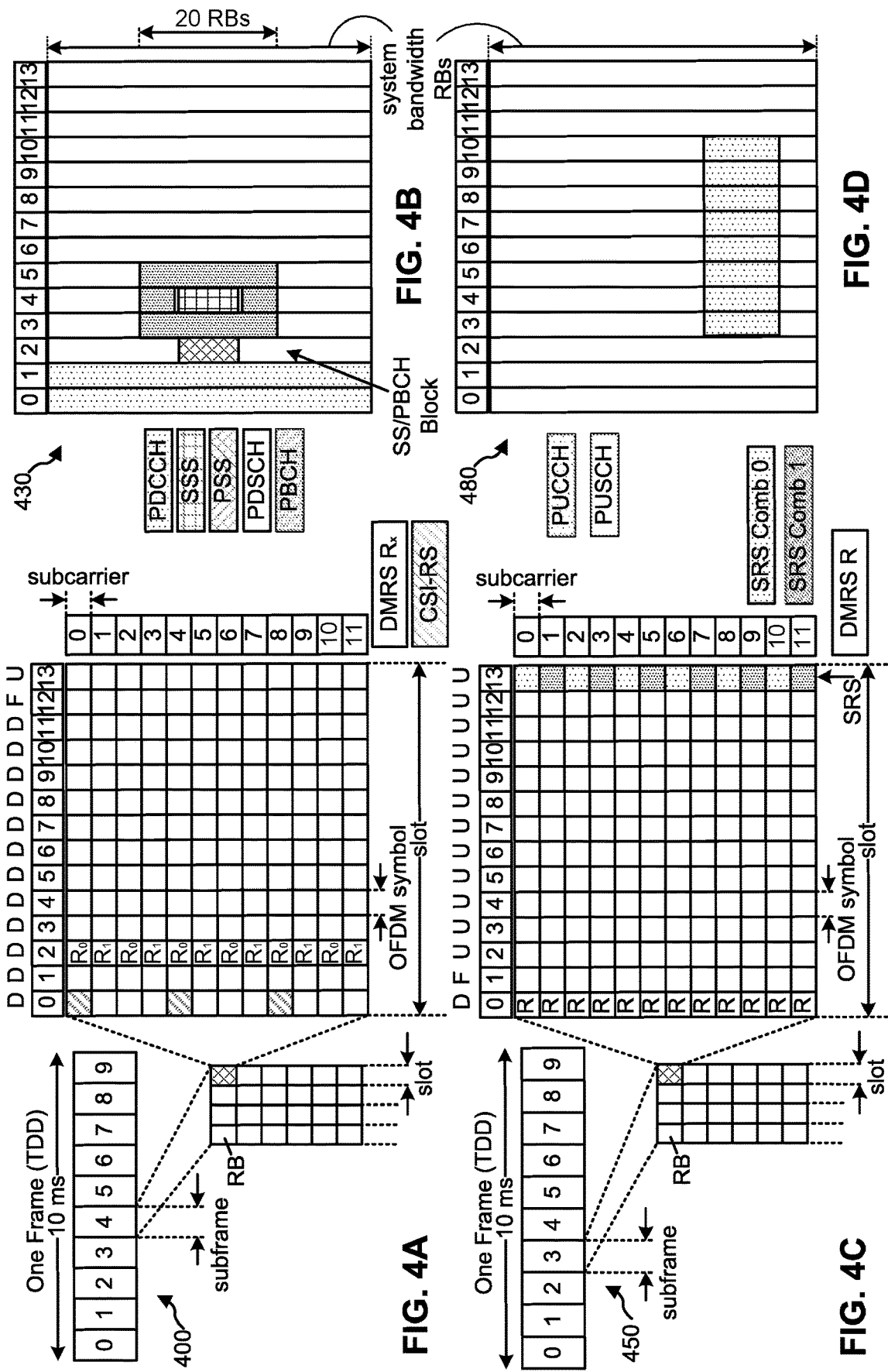
FIGS. 4A, 4B, 4C, and 4D depict aspects of data structures for a wireless communications network, in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing. OFDM and SC-FDM partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2 slots/subframe. The subcarrier spacing and symbol length/duration are a function of the numerology. The subcarrier spacing may be equal to $2^{9\mu} \times 15$ kHz, where is the numerology index, which may be selected from values 0 to 5. Accordingly, the numerology β=0 has a subcarrier spacing of 15 kHz and the numerology μ=5 has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include DMRSs and/or CSI-RSs for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The PDCCH carries DCI within one or more control channel elements (CCEs), each CCE including, for example, nine RE groups (REGs), each REG including, for example, four consecutive REs in an OFDM symbol.

A PSS may be within symbol 2 of particular subframes of a frame. The PSS is used by a UE (e.g., UE 120) to determine subframe/symbol timing and a physical layer identity.

A SSS may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The PBCH, which carries a master information block (MIB), may be logically grouped with the PSS and SSS to form a synchronization signal (SS)/PBCH block (SSB). The MIB provides a number of RBs in the system bandwidth and a system frame number (SFN). The PDSCH carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit SRSs. The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
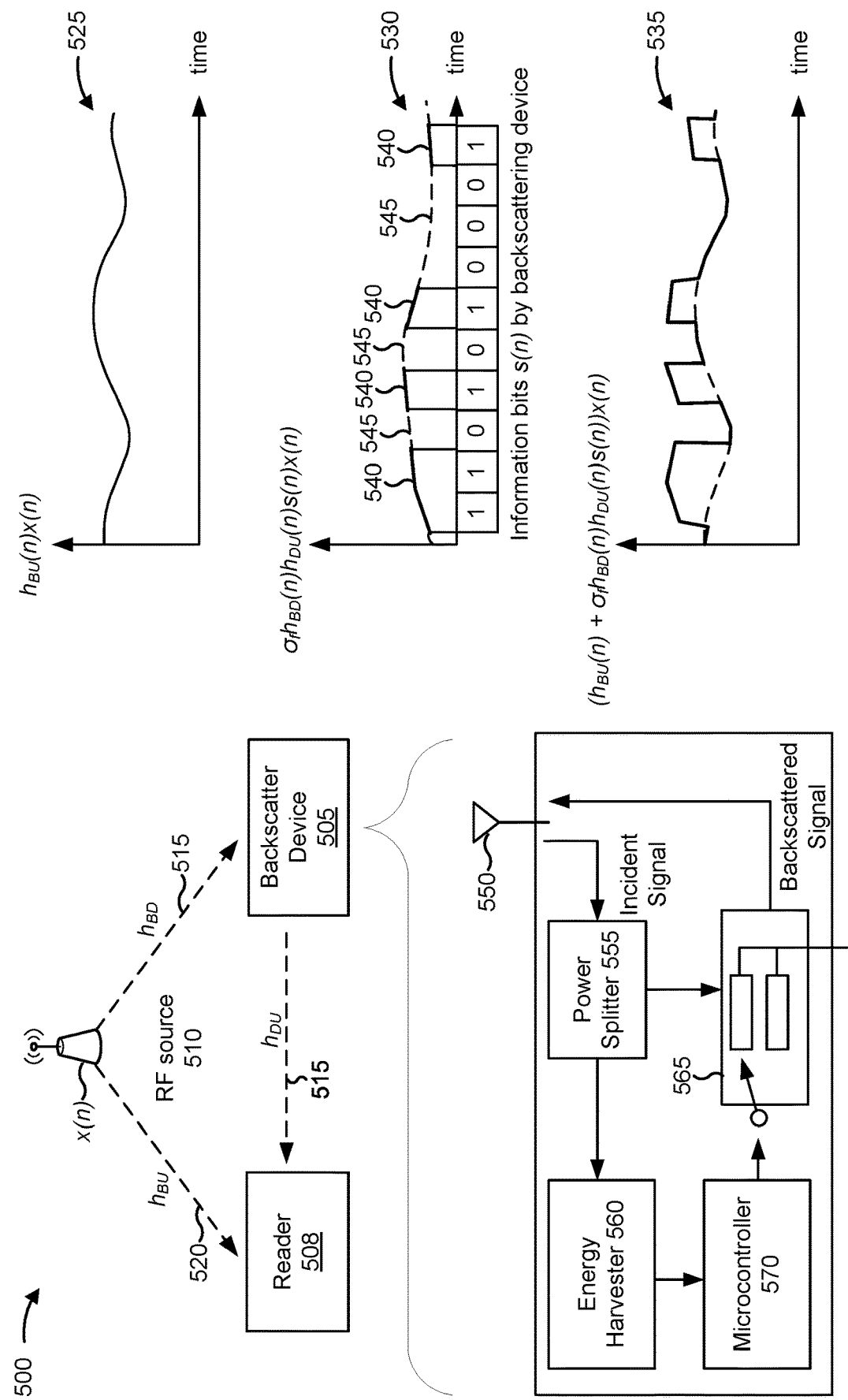
FIG. 5 is a diagram illustrating an example associated with backscatter communications, in accordance with the present disclosure.

FIG. 5 is a diagram illustrating an example 500 associated with backscatter communications, in accordance with the present disclosure.

Some wireless communication devices may be considered IoT devices, such as ambient IoT devices (sometimes referred to as ultra-light IoT devices), or similar IoT devices. IoT technology may include passive IoT (e.g., NR passive IoT for 5G Advanced), semi-passive IoT, ultra-light IoT, or ambient IoT, among other examples. In passive IoT, a terminal (e.g., a RFID device, a tag, or a similar device) may not include a battery, and the terminal may accumulate energy from radio signaling. The terminal may be a passive UE. A passive UE may be a passive UE without energy storage or a passive UE with energy storage. A passive UE without energy storage may include a capacitor to instantaneously (or near-instantaneously) provide energy from the RF to the passive UE. A passive UE with energy storage may have some limited energy storage capability.

The terminal may accumulate solar energy to supplement accumulated energy from radio signaling. In passive IoT, a communication distance may be up to 30 meters (or more) to facilitate feasible network coverage over a large area (e.g., 5000 square meters), such as in a warehouse. Moreover, the power consumption of a passive IoT terminal (e.g., a UE) may be less than 0.1 milliwatts (mW) to support operation without a battery, and the terminal may be relatively inexpensive to facilitate cost-sensitive uses. A positioning accuracy of a passive IoT terminal may be approximately 3-5 meters in the horizontal and the vertical directions.

Passive IoT may be useful in connection with industrial sensors, for which battery replacement may be prohibitively difficult or undesirable (e.g., for safety monitoring or fault detection in smart factories, infrastructures, or environments). Additionally, features of passive IoT devices, such as low cost, small size, maintenance-free, durable, long lifespan, or the like, may facilitate smart logistics/warehousing (e.g., in connection with automated asset management by replacing RFID tags). Furthermore, passive IoT may be useful in connection with smart home networks for household item management, wearable devices (e.g., wearable devices for medical monitoring for which patients do not need to replace batteries), and/or environment monitoring. To achieve further cost reduction and zero-power communication, 5G+/6G wireless networks may utilize a type of passive IoT device referred to as an "ambient backscatter device" or a "backscatter device."

As shown in FIG. 5, a backscatter device 505 (e.g., a tag, a sensor, or the like), which may be one example of a passive IoT device (e.g., a passive UE), may employ a simplified hardware design that does not include a battery, such that the backscatter device 505 relies on energy harvesting for power, and that does not include a radio wave generation circuit, such that the backscatter device 505 is capable of transmitting information only by reflecting a radio wave. More particularly, the backscatter device 505 may communicate with a reader 508 (e.g., a UE 120, a BS 110, or another network device) by modulating a reflecting radio signal from an RF source 510 (e.g., a BS 110, a UE 120, or another network device). In some examples, the RF source 510 and the reader 508 may be the same device and/or may be co-located. For example, in some cases, the reader 508 and the RF source 510 may be associated with the same network node (e.g., BS 110 or a disaggregated base station as discussed with respect to FIG. 3).

To facilitate communication of the backscatter device 505, the RF source 510 may transmit an energy harvesting wave to the backscatter device 505. The energy harvesting wave may be transmitted for a sufficient duration in order to enable a communication phase for a target range between the reader 508 and the backscatter device 505. Additionally, or alternatively, in some cases, a range between the RF source 510 and the backscatter device 505 may be limited by a minimum received power for triggering energy harvesting at the backscatter device 505, such as −20 decibel milliwatts (dBm).

Once energy is sufficiently accumulated at the backscatter device 505, the backscatter device 505 may begin to reflect the radio wave that is radiated onto the backscatter device 505 via a backscatter link 515 (e.g., a reflection link). In some examples, the portion of backscatter link 515 between the RF source 510 and the backscatter device 505 may be referred to as a "forward link" and the portion of backscatter link 515 between the backscatter device 505 and the reader 508 may be referred to as a "backscattering link." For example, the RF source 510 may initiate a communication session (sometimes referred to as a query-response communication) with a query, which may be a modulating envelope of a continuous wave (CW). The backscatter device 505 may respond by backscattering of the CW. The communication session may include multiple rounds, such as for purposes of contention resolution when multiple backscatter devices respond to a query. A channel between the RF source 510 and the backscatter device 505 of the backscatter link 515 may be associated with a first backscatter link channel response value (sometimes referred to as a first backscatter link channel coefficient or a first backscatter link gain value), $h_{BD}$. As described below, the backscatter device 505 may have reflection-on periods and reflection-off periods that follow a pattern that is based at least in part on the transmission of information bits by the backscatter device 505.

The reader 508 may detect the reflection pattern of the backscatter device 505 and obtain the backscatter communication information via the backscatter link 515. A channel between the reader 508 and the backscatter device 505 of the backscatter link 515 may be associated with a second backscatter link channel response value (sometimes referred to as a second backscatter link channel coefficient or a second backscatter link channel gain value), $h_{DU}$. In addition, the RF source 510 and the reader 508 may communicate (e.g., reference signals and/or data signals) via a direct link 520 (e.g., a direct propagation link). A channel between the RF source 510 and the reader 508 of the direct link 520 may be associated with a direct link channel response value (sometimes referred to as a direct link channel coefficient or a direct link channel gain value), $h_{BU}$.

The backscatter device 505 may use an information modulation scheme, such as amplitude shift keying (ASK) modulation or on-off keying (OOK) modulation. For ASK or OOK modulation, the backscatter device 505 may switch on reflection when transmitting an information bit "1" and switch off reflection when transmitting an information bit "0." In backscatter communication, the RF source 510 may transmit a particular radio wave (e.g., a reference signal or a data signal, such as a PDSCH), which may be denoted as x(n). The reader 508 may receive this radio wave, x(n), directly from the RF source 510 via the direct link 520, as well as from the backscatter device 505 modulating and reflecting the radio wave to the reader 508 via the backscatter link 515. The signal received at the reader 508 via the direct link 520, denoted as $h_{BU}(n)x(n)$ and indicated by reference number 525, is the product of the radio wave transmitted by the RF source 510, x(n), multiplied by the direct link channel response value, $h_{BU}$, plus any signal noise. The information bits signal of the backscatter device 505 may be denoted as s(n) where s(n) ∈ {0,1}. Accordingly, the signal received at the reader 508 via the backscatter link 515, denoted as $\sigma_f h_{BD}(n)h_{DU}(n)s(n)x(n)$ and indicated by reference number 530, is the product of the signal transmitted by the RF source 510, x(n), multiplied by the first backscatter link channel response value, $h_{BD}$, the second backscatter link channel response value, $h_{DU}$, the information bits signal from the backscatter device 505, s(n), and a reflection coefficient associated with the backscatter device 505, of, plus any noise.

Thus, the resulting signal received at the reader 508, which is the superposition of the signal received via the direct link 520 and the signal received via the backscatter link 515, may be denoted as y(n) where y(n)=($h_{BU}(n)+\sigma_f h_{BD}(n)h_{DU}(n)s(n)$) x(n)+noise. This signal, y(n), is shown by reference number 535. As shown, when s(n)=0 (indicated by reference number 540 in the plot shown at reference number 530), the backscatter device 505 may switch off reflection, such that the signal component $\sigma_f h_{BD}(n)h_{DU}(n)s(n)$ equals zero, and thus the reader 508 receives only the direct link 520 signal (e.g., y(n)=$h_{BU}(n)x(n)$+noise). When s(n)=1 (indicated by reference number 545 in the plot shown at reference number 530), the backscatter device 505 may switch on reflection, such that signal component $\sigma_f h_{BD}(n)h_{DU}(n)s(n)$ equals $\sigma_f h_{BD}(n)h_{DU}(n)$, and thus the reader 508 receives a superposition of both the direct link 520 signal and the backscatter link 515 signal (e.g., y(n)=($h_{BU}(n)+\sigma_f h_{BD}(n)h_{DU}(n)$) x(n)+noise). To receive the information bits transmitted by the backscatter device 505, the reader 508 may first decode x(n) based at least in part on the direct link channel response value of $h_{BU}(n)$ by treating the backscatter link 515 signal as interference. The reader 508 may then detect the existence of the signal component $\sigma_f h_{BD}(n)$ $h_{DU}(n)x(n)$ by subtracting $h_{BU}(n)x(n)$ from y(n). In some cases, the backscatter device 505 may not maintain a state from communication session to communication session except of what is stored in the backscatter device 505 memory, such as an electronic product code associated with backscatter device 505 or similar information.

As further shown, backscatter device 505 may receive an incident signal via antenna 550. For example, the backscatter device 505 may receive the incident signal from RF source 510 over backscatter link 515. A power splitter 555 may direct at least some of the incident signal (or energy from the incident signal) to an energy harvester 560. The power splitter 555 may also direct at least some of the incident signal to an integrated circuit (IC) 565. The IC may reflect the incident signal ("backscattered signal"), via the antenna 550, over the backscatter link 515 to the reader 508.

The energy directed to energy harvester 560 may power microcontroller 570. Microcontroller 570 may modulate data for the backscattered signal (e.g., by switching between impedances of the IC 565). Switching to an impedance of the IC 565 that is closer to the impedance of the antenna 550 than a previous impedance of the IC 565 may cause the power splitter 555 to divert more of the incident signal (or energy from the incident signal) to the energy harvester 560. Switching to an impedance of the IC 565 that is farther from the impedance of the antenna 550 than a previous impedance of the IC 565 may cause the power splitter 555 to divert more of the incident signal to the IC 565 (e.g., for reflection to the reader 508).

As indicated above, FIG. 5 is provided as an example. Other examples may differ from what is described with regard to FIG. 5.

Figure 6:
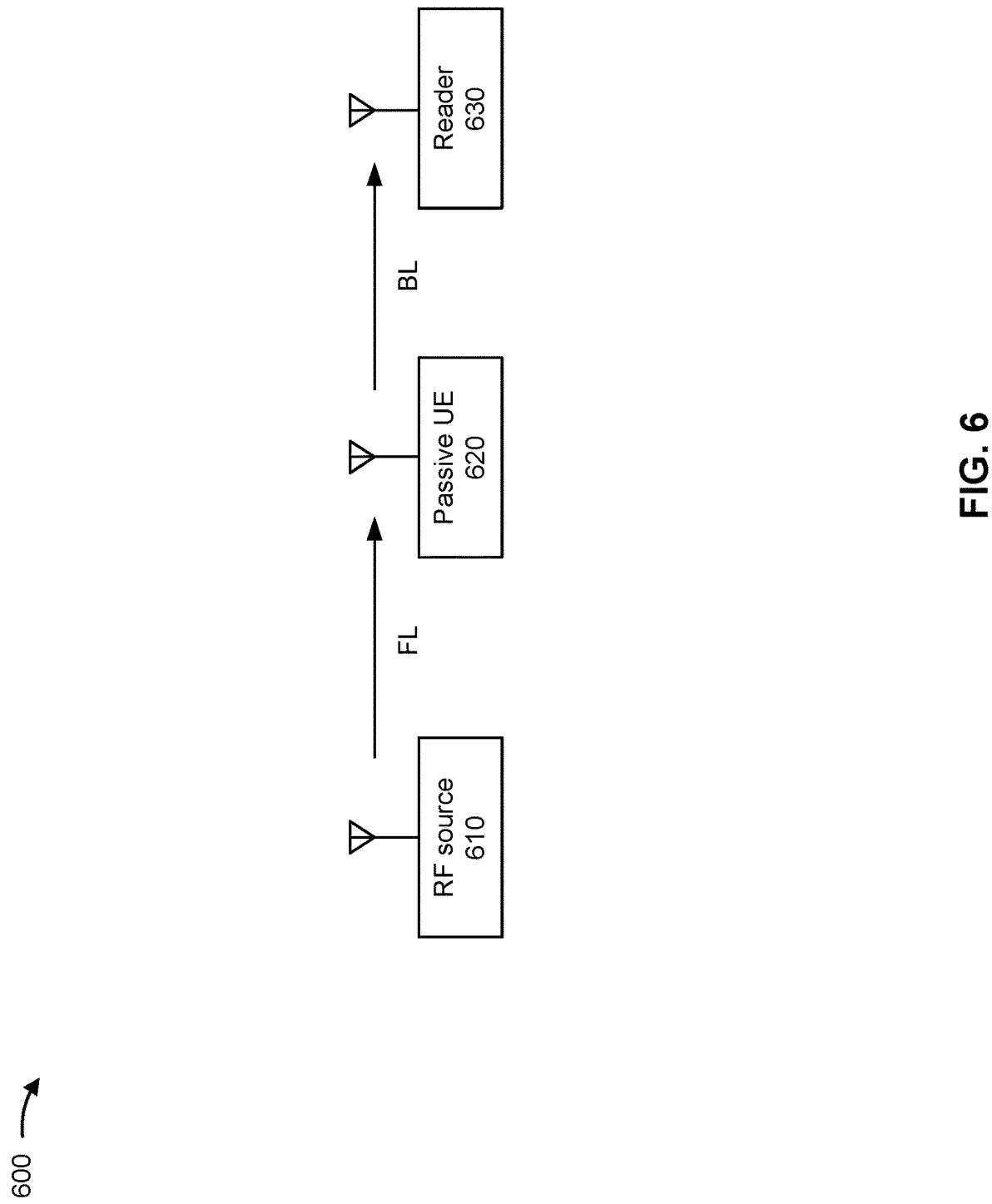
FIG. 6 is a diagram illustrating an example associated with received power at a passive UE, in accordance with the present disclosure.

FIG. 6 is a diagram illustrating an example 600 associated with received power at a passive UE, in accordance with the present disclosure. As shown, a forward link ("FL") may be established between an RF source 610 and a passive UE 620, and a backscattering link ("BL") may be established between the passive UE 620 and a reader 630. Energy harvested at the passive UE 620 may be a function of the forward link, and a SNR of data received by the reader 630 may be a function of the forward link, backscattering link, and antenna of the passive UE 620.

The passive UE 620 may receive power from the RF source 610 over the forward link and dedicate some of the received power to energy harvesting and some of the received power to backscattering. The power dedicated to energy harvesting may be referred to as "absorbed power" and the power dedicated to backscattering (e.g., to the reflected signal) may be referred to as "reflected power."

The power received by the passive UE 620 may be equal to the absorbed power plus the reflected power. For example, absorbed power may be characterized as $\alpha(1-|S|^2)P_{received}$, where a may be a loss factor related to the transfer of the received power ($P_{received}$) to harvested energy, and $$|s|^2 = \left|\frac{Z_L - Z_s^*}{Z_L + Z_S}\right|^2,$$

where $Z_L$ and $Z_S$ may be, respectively, the impedance of an IC of the passive UE 620 and the impedance of an antenna of the passive UE 620. The reflected power may be characterized as $|S|^2 P_{received}$.

From these relationships, it follows that, as the difference between $Z_L$ and $Z_S$ decreases, the absorbed power increases and the reflected power decreases. For example, when a difference between the respective values for $Z_L$ and $Z_S$ is less than a threshold (e.g., when respective values for $Z_L$ and $Z_S$ match), the absorbed power may be larger than a threshold and the reflected power may be smaller than a threshold. Conversely, as the difference between $Z_L$ and $Z_S$ increases, the absorbed power decreases and the reflected power increases. For example, when a difference between the respective values for $Z_L$ and $Z_S$ is greater than a threshold (e.g., when respective values for $Z_L$ and $Z_S$ do not match), the absorbed power may be smaller than a threshold and the reflected power may be larger than a threshold.

As a result, there may be a tradeoff between the energy harvested by the passive UE 620 and the SNR of the data received by the reader 630. This tradeoff may impact the operation of passive UE 620 in cases where the passive UE 620 is a passive UE without energy storage or a passive UE with energy storage. In a case where the passive UE 620 is a passive UE without energy storage, if the received power at the passive UE 620 is less than a threshold (e.g., −20 or −30 dBm), then the passive UE 620 may turn off. In a case where the passive UE 620 is a passive UE with energy storage, if the ECHR at the passive UE 620 is high (e.g., greater than a threshold), then the passive UE 620 may exhaust the energy stored in the energy storage and turn off. In either case, the tradeoff between the energy harvested by the passive UE 620 and the SNR of the data received by the reader 630 may force the passive UE 620 to turn off when the passive UE 620 cannot harvest sufficient energy due to SNR requirements.

The tradeoff between harvested energy and an SNR of transmitted data may also impact the operation of an energy-harvesting-enabled UE. An energy-harvesting-enabled UE may be a UE (e.g., a non-passive UE) that is capable of harvesting energy from a received transmission. For example, if the ECHR at the energy-harvesting-enabled UE is high (e.g., greater than a threshold), then the energy-harvesting-enabled UE may exhaust the energy stored in the energy storage of the energy-harvesting-enabled UE and turn off.

As indicated above, FIG. 6 is provided as an example. Other examples may differ from what is described with regard to FIG. 6.

Figure 7:
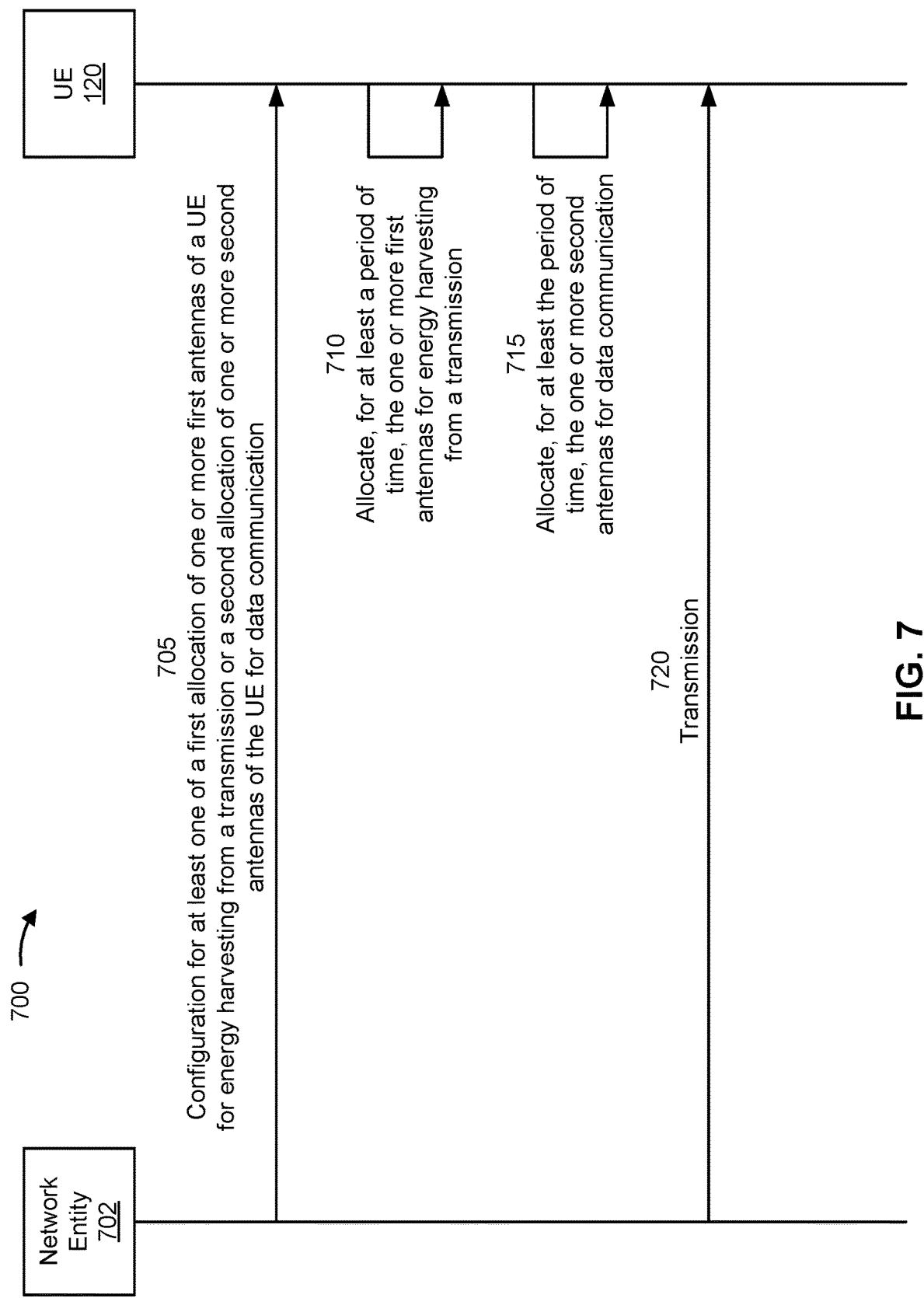
FIG. 7 is a diagram illustrating an example associated with allocation of antennas for energy harvesting or data communication, in accordance with the present disclosure.

FIG. 7 is a diagram illustrating an example 700 associated with allocation of antennas for energy harvesting or data communication, in accordance with the present disclosure. As shown in FIG. 7, a network entity 702 (e.g., BS 110, or a disaggregated base station as discussed with respect to FIG. 3) and a UE 120 may communicate with one another.

As shown by reference number 705, the network entity 702 may output, and the UE 120 may receive, a configuration for at least one of a first allocation of one or more first antennas of the UE 120 for energy harvesting from a transmission or a second allocation of one or more second antennas of the UE 120 for data communication. Some specific examples of the configuration are provided elsewhere herein.

In some aspects, the configuration may configure the first allocation and/or the second allocation using one or more antenna ports of the UE 120 (e.g., the configuration may configure one or more first antenna ports for the energy harvesting and one or more second antenna ports for the data communication). An antenna port may be a logical construct that represents some combination of the antennas (e.g., the physical antennas) and/or channels. An antenna port may be defined such that a channel, over which a symbol on the antenna port is conveyed, can be inferred from a channel over which another symbol on the same antenna port is conveyed.

The configuration may enable the network entity 702 to dynamically configure the first allocation and/or the second allocations for the antennas between the energy harvesting and the data communication, which may enable dynamic antenna switching between energy harvesting and data communications. For example, the dynamic antenna switching may enable dynamic control of the performance of energy harvesting efficiency and/or ECHR at a passive UE or energy-harvesting-enabled UE over links having time-varying channel states. As a result, a passive UE may maintain a received power above a shutoff threshold (e.g., −20/−30 dBm) and/or an energy-harvesting-enabled UE may retain sufficient energy stored in a battery while the passive UE or the energy-harvesting-enabled UE maximize communications efficiency.

As shown by reference number 710, the UE 120 may allocate, for at least a period of time, the one or more first antennas for the energy harvesting. Allocating the one or more first antennas for the energy harvesting may enable the UE 120 to harvest energy from a transmission via the one or more first antennas during at least the period of time. For example, once allocated for the energy harvesting, the first antenna(s) may harvest the energy for all or some of the period of time. In some examples, the one or more first antennas may be allocated for the energy harvesting during at least the period of time (e.g., the one or more first antennas may potentially harvest the energy during at least the period of time) and harvest no energy during at least the period of time.

In a case where the UE 120 is a passive UE, at least one of the first antenna(s) may have (e.g., may be configured or set to have) impedances that match (e.g., are within a given threshold from) an impedance of an IC of the UE 120. In a case where the UE 120 is an energy-harvesting-enabled UE, the one or more first antennas may be designated for energy harvesting.

As shown by reference number 715, the UE 120 may allocate, for at least the period of time, the one or more second antennas for the data communication. Allocating the one or more second antennas for the data communication may enable the UE 120 to perform the data communication from a transmission via the one or more second antennas during at least the period of time. For example, once allocated for the data communication, the second antenna(s) may perform the data communication for all or some of the period of time. In some examples, the one or more second antennas may be allocated for the data communication during at least the period of time (e.g., the one or more second antennas may potentially perform the data communication during at least the period of time) and perform no data communication during at least the period of time.

In a case where the UE 120 is a passive UE, at least one of the second antenna(s) may have (e.g., may be configured or set to have) impedances that do not match (e.g., are outside a given threshold from) an impedance of an IC of the UE 120. For example, the second antenna(s) may be allocated for data communication (e.g., backscattering via impedance switching of the IC). In a case where the UE 120 is an energy-harvesting-enabled UE, the one or more second antennas may be allocated for data communication. The one or more second antennas may be allocated, for at least the period of time, for the data communication. In some examples, the one or more second antennas may, during the period of time, perform energy harvesting that is less efficient than the first antenna(s) with matching impedances.

The UE 120 may allocate the one or more first antennas and the one or more second antennas for the same the same period of time, or for respective time windows that overlap during the period of time. In some examples, the UE 120 may allocate the one or more first antennas at a first start time and the one or more second antennas at a second start time which is the same as or different from the first start time. In some examples, the UE 120 may allocate the one or more first antennas until a first end time and the one or more second antennas until a second end time which is the same as or different from the first end time.

The UE 120 may be an M-antenna UE that dynamically allocates $M_E \leq M$ antennas (or antenna ports) for energy harvesting and $M_D \leq M$ antennas (or antenna ports) for data communications, where $M_E + M_D \geq M$. In some examples, if $M_E + M_D = M$, then each antenna may be used for either energy harvesting or data communications (e.g., backscattering communications). In some examples, if $M_E + M_D > M$, then certain antennas may be used for both energy harvesting and data communications. The antennas may be allocated and/or used simultaneously for energy harvesting and for data communication.

Allocating the antennas for at least the period of time (e.g., such that that allocations are active or deployed simultaneously) may enable the UE 120 to manage the tradeoff between the energy harvested by the passive UE and the SNR of the data received by the reader. For example, if the UE 120 is losing energy and on pace to turn off, then the UE 120 may allocate more antennas for energy harvesting, which may enable the UE 120 to remain operational. If the UE 120 has sufficient energy to remain operational for a given quantity of time, then the UE 120 may allocate more antennas for the reflecting, which may maximize communications efficiency.

As shown by reference number 720, network entity 702 may output, and UE 120 may receive, the transmission. In some examples, the UE 120 may receive the transmission during the period of time for which the one or more first antennas are allocated for energy harvesting and the one or more second antennas are allocated for data communication. The UE 120 may harvest energy from the transmission using the one or more first antennas and/or perform data communication using the one or more second antennas. For example, in a case where the UE 120 is a passive UE, the UE 120 may reflect the transmission using the second antenna(s) via impedance switching. Or, in a case where the UE 120 is an energy-harvesting-enabled UE, the UE 120 may transmit a data communication using the second antenna(s). The data communication may or may not be responsive or otherwise related to the transmission outputted by the network entity 702. In some examples, the transmission may be based on the configuration discussed above in connection with reference number 705 (e.g., the transmission may be based on the dynamic antenna allocation). For example, the layers of the transmission may be less than or equal to $M_D$, which is discussed above in connection with reference number 710 and reference number 715. The allocation of the one or more first antennas and the allocation of the one or more second antennas may enable the UE 120 to efficiently conserve energy while providing data communications. Thus, the UE 120 may remain operational by allocating the antennas for energy harvesting or for data communication.

As the quantity of antennas that are used for energy harvesting increases, the energy harvesting efficiency may increase, the data communication efficiency (e.g., backscattering data communication efficiency) may decrease, and/or the time to complete the data communication (e.g., backscattering data communication) may increase. As the quantity of antennas that are used for data communication increases, the data communication efficiency may increase, the energy harvesting efficiency may decrease, and/or the likelihood that the UE 120 will turn off due to a lack of energy may increase.

In some examples, the UE 120 may allocate an initial quantity of the one or more second antennas for data communication. For example, in a case where the UE 120 is an M-antenna passive UE, the initial quantity may be allocated and/or used for the data communication after the UE 120 harvests enough energy (e.g., using all M antennas) to begin performing backscattering data modulation. For example, after harvesting a threshold amount of energy (e.g., after being activated or turned on), the UE 120 may allocate $M_{D,initial}$ antennas for impedance switching (e.g., for backscattering data transmission) and allocate $M-M_{D,initial}$ antennas for energy harvesting. Thus, the network entity 702 and/or UE 120 may establish the initial antenna states for backscattering communications.

In some examples, the initial quantity may be a default quantity. For example, the initial quantity may be a default setting, such as $M_{D,initial}=1$. In some examples, the initial quantity may be a configured quantity. For example, the RF source (e.g., network entity 702) may output, and the UE 120 may receive, a configuration for $M_{D,initial}$ (e.g., the configuration shown at reference number 705). For instance, the RF source may indicate $M_{D,initial}$ using an envelop command in a waveform in a forward link channel during energy harvesting. The initial quantity of antenna(s) allocated for the reflecting may enable the UE, after harvesting sufficient energy to perform the reflecting, to carry out the data communication with any suitable initial number of antennas.

In some examples, the UE 120 may transmit, and the network entity 702 may obtain, an indication of information relating to a maximum quantity of antennas allocable for the data communication. The UE 120 may transmit the indication of the information before allocating the first antenna(s) and the second antenna(s). For example, in a case where the UE 120 is an M-antenna passive UE, the UE 120 may indicate, to the reader and/or the RF source (e.g., to the RF source via the reader), assistance information from which the network entity 702 may determine that the UE 120 can use $M_{D,max}$ antennas for impedance switching (e.g., for backscattering data transmission).

Thus, in some examples, the configuration (e.g., the configuration shown at reference number 705) may specify a quantity of the one or more second antennas that does not exceed $M_{D,max}$. For example, in a case where the UE 120 is a passive UE without energy storage, the UE 120 may allocate $M-M_{D,max}$ antennas for energy harvesting to maintain a received power greater than a threshold below which the UE 120 shuts off (e.g., −20/−30 dBm). In another example, in a case where the UE 120 is a passive UE with energy storage, the UE 120 may allocate $M-M_{D,max}$ antennas for energy harvesting to maintain an ECHR below a threshold (e.g., less than or equal to 1).

In some examples, the UE 120 may transmit, and the network entity 702 may obtain, an indication of information relating to an adjusted maximum quantity of the antennas allocable for the data communication. The adjusted maximum quantity may be greater than or less than a previous indication of a maximum quantity of antennas allocable for the data communication (e.g., greater than or less than $M_{D,max}$). For example, the UE 120 may transmit the indication of information relating to the adjusted maximum quantity of the antennas allocable for the data communication after transmitting the indication of the information relating to the maximum quantity of antennas allocable for the data communication. In a case where the UE 120 is an M-antenna passive UE, the UE 120 may indicate, to the reader and/or the RF source (e.g., to the RF source via the reader), assistance information from which the network entity 702 may determine that the UE 120 can use an adjusted value of $M_{D,max}$ antennas for impedance switching (e.g., for backscattering data transmission).

The UE 120 may transmit the indication of the information relating to the maximum quantity of antennas allocable for data communication (and/or the indication of the information relating to the adjusted maximum quantity of antennas allocable for data communication) based on an amount of harvested energy. For example, in a case where the UE 120 is a passive UE without energy storage, upon measuring that the received power is less than, equal to, or within a threshold of −20/−30 dBm, the UE 120 may transmit an indication of the same to the reader and/or RF source. In another example, in a case where the UE 120 is a passive UE with energy storage, upon measuring that the ECHR is greater than 1, the UE 120 may transmit an indication of the same to the reader and/or RF source. Thus, the assistance information may include, for example, an indication of an amount of harvested energy at the UE 120 at a given time.

The indication of the maximum quantity (and/or the adjusted maximum quantity) may dynamically inform the network entity 702 of the allocation capabilities of the UE 120 at a given time. In some examples, the indication of the maximum quantity (or the adjusted maximum quantity) may enable the UE 120 to initiate a proactive antenna state adjustment before the UE 120 loses power and, thus, operational capabilities. For example, the network entity 702 may configure the UE 120 to dynamically adjust the allocations of the first antenna(s) and/or second antenna(s) based on the indication of the maximum quantity and/or the adjusted maximum quantity.

In some examples, the network entity 702 may output a configuration (e.g., the configuration shown at reference number 705) of a quantity or range of quantities of the one or more second antennas, and the UE 120 may receive the configuration (e.g., an indication of the configured quantity or a configured range of quantities of the one or more second antennas). For example, the configuration may specify a quantity or range of quantities of the one or more second antennas that does not exceed an original or adjusted value of $M_{D,max}$. For example, in a case where the UE 120 is an M-antenna passive UE, the RF source (e.g., network entity 702) may determine $M_{D,max}$ based on the assistance information, and indicate, to the UE 120, to use $M_D \leq M_{D,max}$ antennas for backscattering communications. If the configuration specifies a quantity of the one or more second antennas, then the UE 120 may allocate the specified quantity of the one or more second antennas. If the configuration specifies a range of quantities of the one or more second antennas (e.g., 0-$M_{D,max}$), then the UE 120 may allocate a quantity of the one or more second antennas within the range of quantities. In some examples, the reader may be indicated (e.g., by the RF source) to monitor multiple resources to decode the data backscattered from multiple antennas. For example, the reader may determine whether an adjustment to $M_D$ (e.g., increase or decrease) may be warranted based on the backscattered communications. The indication of the configured quantity or the configured range of quantities of antennas to be allocated for the reflecting may enable the network entity 702 (e.g., the reader and/or the RF source) to dynamically update the antennas and optimize the trade-off between energy harvested and data communications (e.g., reflections).

In some examples, the network entity 702 may output a configuration (e.g., the configuration shown at reference number 705) of, and the UE 120 may receive an indication of, one or more of: a modulation scheme for the data communication, an impedance switching frequency for the data communication, a modulation order for the data communication, a coding scheme for the data communication, or a coding rate for the data communication. For example, in a case where the UE 120 is a passive UE, the RF source (e.g., network entity 702) may indicate the backscattering modulation scheme, backscattering impedance switching frequency, backscattering modulation order, backscattering coding scheme, backscattering coding rate, or the like. Examples of a backscattering modulation scheme may include ASK, frequency-shift keying (FSK), phase-shift keying (PSK), OOK, or the like. Configuring one or more of these parameters may enable targeted adjustment of the antennas for optimal energy harvesting and data communication. In some examples, the UE 120 may apply different schemes to different antennas, which may improve data communications based on diversity gain and/or multiplexing gain.

Some techniques described herein may leverage an $M_D$-antenna-set selection scheme. For example, the UE 120 may include a plurality of sets of one or more antennas that are allocable for data communication. In some examples, a first set may be selected (e.g., by the network entity 702). Thus, the network entity 702 may output a configuration (e.g., the configuration shown at reference number 705), and the UE 120 may receive an indication, to allocate the first set of antennas (for example). For instance, the first set may include the one or more second antennas that are allocated for data communication.

In some examples, the first set may be selected for allocation based on a target SNR of the data communication. For example, in a case where the UE 120 is a passive UE, the UE 120 may employ a multiple-$M_D$-antenna-set hypothesis, and the reader (and/or RF source) may select which $M_D$-antenna-set in the $M_D$-antenna-set hypothesis switching scheme would maximize the SNR. Thus, selecting the antennas as a set may improve the SNR of the data received by the reader. Additionally, or alternatively, the set may increase the diversity gain.

In some examples, the UE 120 (e.g., an energy-harvesting-enabled UE) may transmit, and the network entity 702 may obtain, a request to adjust at least one of a quantity of the one or more first antennas or a quantity of the one or more second antennas. In accordance with the request, the network entity 702 may output a configuration (e.g., the configuration shown at reference number 705), and the UE 120 may receive, an indication (e.g., a configuration) to adjust the antenna states ($M_E$>$M_D$) of the UE 120. For example, the configuration may configure the UE 120 to adjust the at least one of the quantity of the one or more first antennas or the quantity of the one or more second antennas.

In some examples, the UE 120 may transmit a request to perform at least one of increasing the quantity of the one or more first antennas or decreasing the quantity of the one or more second antennas. For example, the UE 120 may transmit the request in accordance with an amount of energy of the UE 120 (e.g., an energy level of a battery) being below a first threshold and an ECHR being above a second threshold. Thus, in accordance with the request, the network entity 702 may output, and the UE 120 may receive, a configuration (e.g., the configuration shown at reference number 705) for at least one of an increase in the quantity of the one or more first antennas or a decrease in the quantity of the one or more second antennas.

The harvested energy being below the first threshold may indicate that the amount of harvested energy is low, and the ECHR being above the second threshold may indicate that the amount of harvested energy is dropping because more energy is being consumed than harvested. In this scenario, the UE 120 may be in a "low-battery mode." As a result, additional antennas may be allocated for energy harvesting and fewer antennas may be allocated for data communication, which may increase the energy harvesting efficiency.

In some examples, the UE 120 may transmit a request to perform at least one of decreasing the quantity of the one or more first antennas or increasing the quantity of the one or more second antennas. For example, the UE 120 may transmit the request in accordance with an amount of harvested energy being above a first threshold and an ECHR being below a second threshold. Thus, in accordance with the request, the network entity 702 may output, and the UE 120 may receive, a configuration (e.g., the configuration shown at reference number 705) for at least one of a decrease in the quantity of the one or more first antennas or an increase in the quantity of the one or more second antennas.

The harvested energy being above the first threshold may indicate that the amount of harvested energy is high, and the ECHR being above the second threshold may indicate that the amount of harvested energy is rising because more energy is being harvested than consumed. In this scenario, the UE 120 may be in a "good-battery mode." As a result, fewer antennas may be allocated for energy harvesting and additional antennas may be allocated for data communication, which may increase communications efficiency (e.g., higher data rate, higher spectrum efficiency, higher MIMO layers, or the like).

Some aspects described herein relate to positioning-based antenna states. In at least one use case for positioning-based antenna states, the UE 120 may be an energy-harvesting-enabled UE, such as an unmanned vehicle (e.g., an unmanned aerial vehicle (UAV), an autonomous car, or the like). For example, the UAV (e.g., a drone) may be part of a fleet of UAVs that belong to a delivery platform.

In some examples, the network entity 702 may output a configuration (e.g., the configuration shown at reference number 705) for the first allocation and the second allocation based on a location of the UE 120. For example, the network entity 702 may indicate, to the UE 120, to use different antenna states based on the location (e.g., positioning) of the UE 120.

In some examples, the UE 120 may allocate the one or more first antennas and allocate the one or more second antennas based on a location of the UE 120 (e.g., based on a distance between the UE 120 and a network entity, such as the network entity 702 or another network entity). For instance, the UE 120 may allocate the one or more first antennas and allocate the one or more second antennas in accordance with the configuration.

The UE 120 may allocate the one or more first antennas and allocate the one or more second antennas based on a positioning reference signal (PRS) measurement, a navigation system (e.g., a global navigation satellite system (GNSS)), or the like. The PRS measurement or navigation system may indicate the distance between the UE 120 and one or more gNBs (e.g., the network entity 702 or another network entity that the UE 120 is within a threshold distance from). For example, the UE 120 may derive a distance between the UE 120 and one or more gNBs from a GNSS position of the UE 120.

In certain locations (e.g., within a threshold distance from a gNB), the network entity 702 may configure the UE 120 to allocate and/or use additional antennas for energy harvesting. For example, as the distance between the UE 120 and the gNB decreases, the UE 120 may use fewer antennas to communicate with the gNB (e.g., for data communication). Therefore, more antennas may be allocated for energy harvesting.

In certain other locations (e.g., outside a threshold distance from a gNB), the network entity 702 may configure the UE 120 to allocate and/or use additional antennas for data communication. For example, as the distance between the UE 120 and the gNB decreases, the UE 120 may use more antennas for data communication to communicate with the gNB. For example, the UE 120 may switch to a "communications-only state" in which all antennas are allocated for data communication.

As indicated above, FIG. 7 is provided as an example. Other examples may differ from what is described with respect to FIG. 7.

Figure 8:
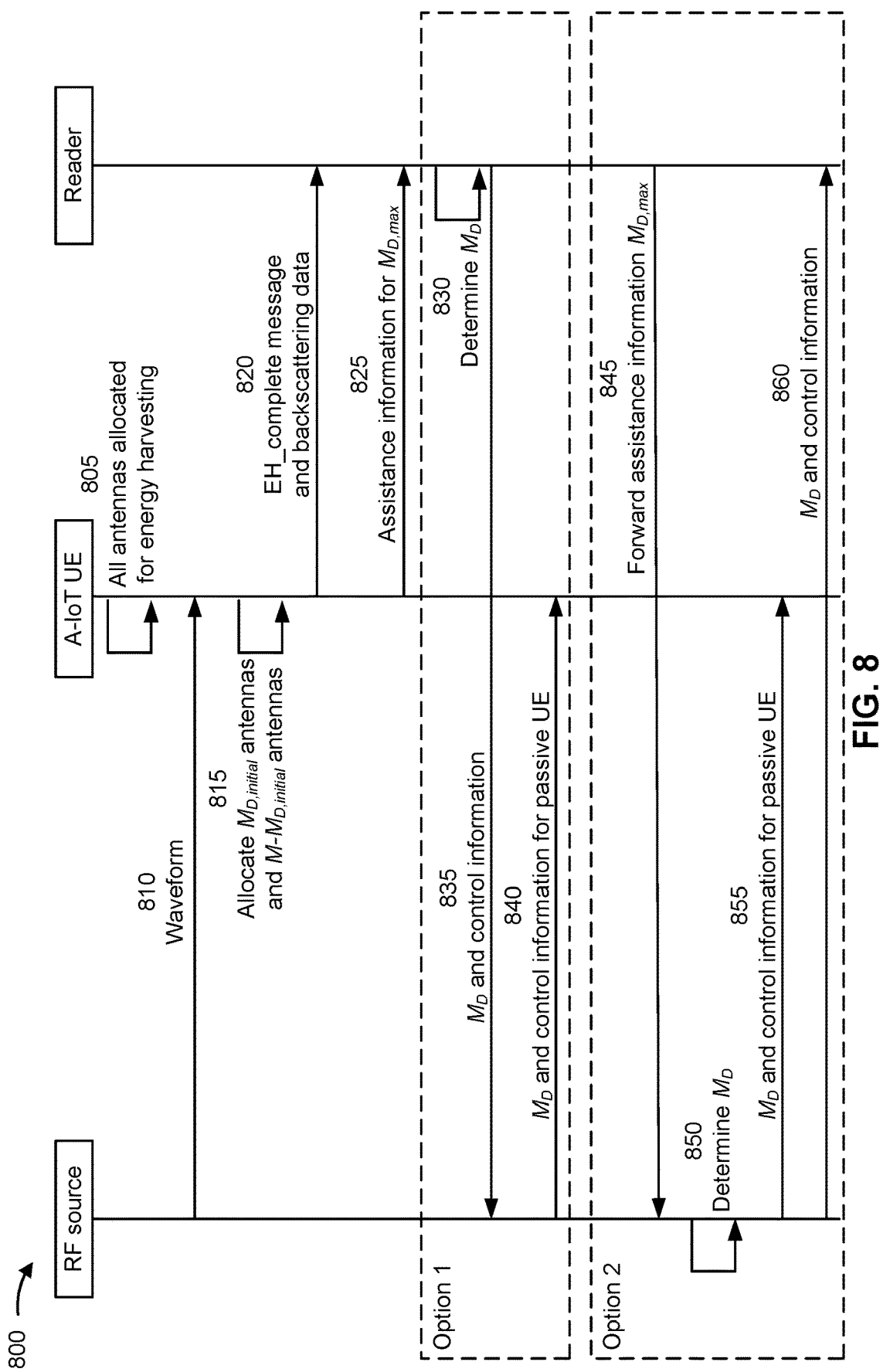
FIG. 8 is a diagram illustrating an example associated with allocation of antennas for energy harvesting or data communication involving a passive UE, in accordance with the present disclosure.

FIG. 8 is a diagram illustrating an example 800 associated with allocation of antennas for energy harvesting or data communication involving a passive UE, in accordance with the present disclosure. As shown in FIG. 8, an RF source, a passive UE, and a reader may communicate with one another. In example 800, the passive UE is an ambient IoT UE ("A-IoT UE").

As shown by reference number 805, before harvesting enough energy to perform backscattering data modulation, the passive UE may allocate all antennas for energy harvesting. As shown by reference number 810, the RF source may transmit, and the passive UE may receive, a waveform. The passive UE may use all antennas to harvest energy from the waveform.

As shown by reference number 815, after harvesting enough energy to perform backscattering data modulation, the passive UE may allocate an initial quantity of antennas ($M_{D,initial}$) for backscattering data transmission and an initial quantity $M-M_{D,initial}$ antennas for energy harvesting. The initial quantities are discussed in greater detail above with reference to FIG. 7.

As shown by reference number 820, the passive UE may transmit, and the reader may obtain, an indication that the energy harvesting is complete ("EH_complete message"). As further shown by reference number 820, the passive UE may transmit, and the reader may obtain, backscattering data (e.g., backscattering data that follows the EH_complete message). The backscattering data may be transmitted via the $M_{D,initial}$ antennas.

As shown by reference number 825, the passive UE may transmit, and the reader may obtain, an indication of assistance information relating to $M_{D,max}$. The assistance information and $M_{D,max}$ are discussed in greater detail above with reference to FIG. 7.

FIG. 8 presents two options regarding how the assistance information is processed. In option 1, the reader is a network entity (e.g., a gNB), and in option 2, the reader is a UE. In both options, the RF source may be a network entity (e.g., a gNB).

In option 1, as shown by reference number 830, the reader may determine a quantity of antennas $M_D$ for backscattering data transmission. For example, the reader may determine $M_{D,max}$ from the assistance information and, based on $M_{D,max}$, determine $M_D$ (e.g., such that $M_D$ is less than $M_{D,max}$). As shown by reference number 835, the reader may output, and the RF source may obtain, an indication of $M_D$ and control information. The control information may include control information for the RF source and/or control information for the passive UE. In some examples, the control information for the RF source may dictate, for one or more resources (e.g., time domain resources and/or frequency domain resources), the type of waveform to be outputted by the RF source. In some examples, the control information for the RF source may dictate how the RF source is to modulate, to the passive UE, the control information for the passive UE. The control information for the passive UE may include a backscattering modulation scheme, backscattering impedance switching frequency, backscattering modulation order, backscattering coding scheme, backscattering coding rate, or the like, as discussed in greater detail above with reference to FIG. 7. The control information for the RF source and/or the control information for the passive UE may be transmitted together in one control message or separately in respective control messages. As shown by reference number 840, the RF source may output, and the passive UE may receive, an indication of $M_D$ and the control information for the passive UE.

In option 2, as shown by reference number 845, the reader may forward, (e.g., transmit) to the RF source, and the RF source may obtain, an indication of the assistance information. As shown by reference number 850, the RF source may determine a quantity of antennas $M_D$ for backscattering data transmission. For example, the RF source may determine $M_{D,max}$ from the assistance information and, based on $M_{D,max}$, determine $M_D$ (e.g., such that $M_D$ is less than $M_{D,max}$). As shown by reference number 855, the RF source may output, and the passive UE may receive, an indication of $M_D$ and the control information for the passive UE. As shown by reference number 860, the RF source may output, and the reader may receive, an indication of $M_D$ and control information for the reader. The control information for the reader may include information that the reader can use to decode the backscattering data communications from the passive UE.

In either option, once configured, the passive UE may allocate $M_D$ antennas for data communication and at least $M-M_D$ antennas for energy harvesting. For example, if the passive UE is losing energy and on pace to turn off, then the RF source may configure the passive UE to allocate more antennas for energy harvesting, which may enable the passive UE to remain operational. Or, if the passive UE has sufficient energy to remain operational for a given quantity of time, then the RF source may configure the passive UE to allocate more antennas for the reflecting (e.g., backscattering), which may maximize communications efficiency.

As indicated above, FIG. 8 is provided as an example. Other examples may differ from what is described with respect to FIG. 8.

Figure 9:
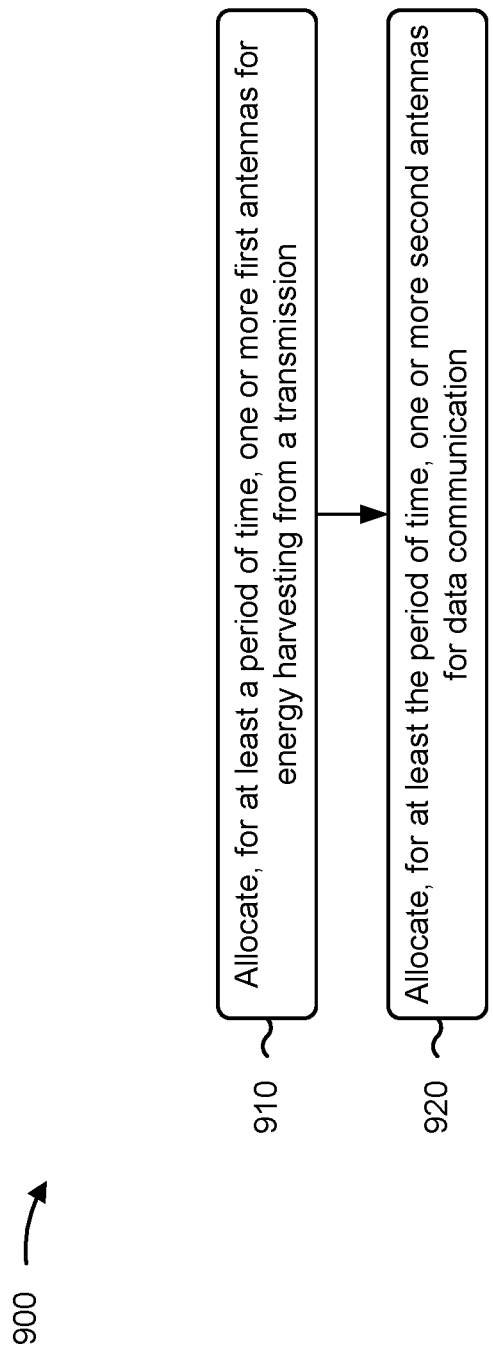
FIG. 9 shows a method for wireless communications by a UE, in accordance with the present disclosure.

FIG. 9 shows a method 900 for wireless communications by a UE, such as UE 120.

Method 900 begins at step 910 with allocating, for at least a period of time, one or more first antennas for energy harvesting from a transmission.

Method 900 then proceeds to step 920 with allocating, for at least the period of time, one or more second antennas for data communication.

In a first aspect, an initial quantity of the one or more second antennas is a default quantity.

In a second aspect, an initial quantity of the one or more second antennas is a configured quantity.

In a third aspect, method 900 includes transmitting an indication of information relating to a maximum quantity of antennas allocable for the data communication.

In a fourth aspect, method 900 includes transmitting, based on an amount of harvested energy, an indication of information relating to an adjusted maximum quantity of the antennas allocable for the data communication.

In a fifth aspect, method 900 includes receiving an indication of a configured quantity or a configured range of quantities of the one or more second antennas.

In a sixth aspect, method 900 includes receiving an indication of one or more of a modulation scheme for the data communication, an impedance switching frequency for the data communication, a modulation order for the data communication, a coding scheme for the data communication, or a coding rate for the data communication.

In a seventh aspect, the one or more second antennas are a first set of a plurality of sets of antennas allocable for the data communication.

In an eighth aspect, the first set is selected for allocation based on a target signal-to-noise ratio of the data communication.

In a ninth aspect, method 900 includes transmitting a request to adjust at least one of a quantity of the one or more first antennas or a quantity of the one or more second antennas, and receiving, in accordance with the request, an indication to adjust the at least one of the quantity of the one or more first antennas or the quantity of the one or more second antennas.

In a tenth aspect, transmitting the request includes transmitting a request to perform at least one of increasing the quantity of the one or more first antennas or decreasing the quantity of the one or more second antennas.

In an eleventh aspect, transmitting the request includes transmitting the request in accordance with an amount of energy of the UE being below a first threshold and an energy-consumption-to-harvesting ratio being above a second threshold.

In a twelfth aspect, transmitting the request includes transmitting a request to perform at least one of decreasing the quantity of the one or more first antennas or increasing the quantity of the one or more second antennas.

In a thirteenth aspect, transmitting the request includes transmitting the request in accordance with an amount of energy of the UE being above a first threshold and an energy-consumption-to-harvesting ratio being below a second threshold.

In a fourteenth aspect, allocating the one or more first antennas and allocating the one or more second antennas includes allocating the one or more first antennas and allocating the one or more second antennas based on a location of the UE.

In a fifteenth aspect, allocating the one or more first antennas and allocating the one or more second antennas includes allocating the one or more first antennas and allocating the one or more second antennas based on a distance between the UE and a network entity.

In a sixteenth aspect, allocating the one or more first antennas and allocating the one or more second antennas includes allocating the one or more first antennas and allocating the one or more second antennas based on a positioning reference signal measurement.

In a seventeenth aspect, allocating the one or more first antennas and allocating the one or more second antennas includes allocating the one or more first antennas and allocating the one or more second antennas based on a navigation system.

In an eighteenth aspect, the UE is a passive UE.

In a nineteenth aspect, the UE is an energy-harvesting-enabled UE.

In a twentieth aspect, method 900 includes harvesting energy from the transmission via the one or more first antennas during at least the period of time, and performing the data communication via the one or more second antennas during at least the period of time.

Figure 11:
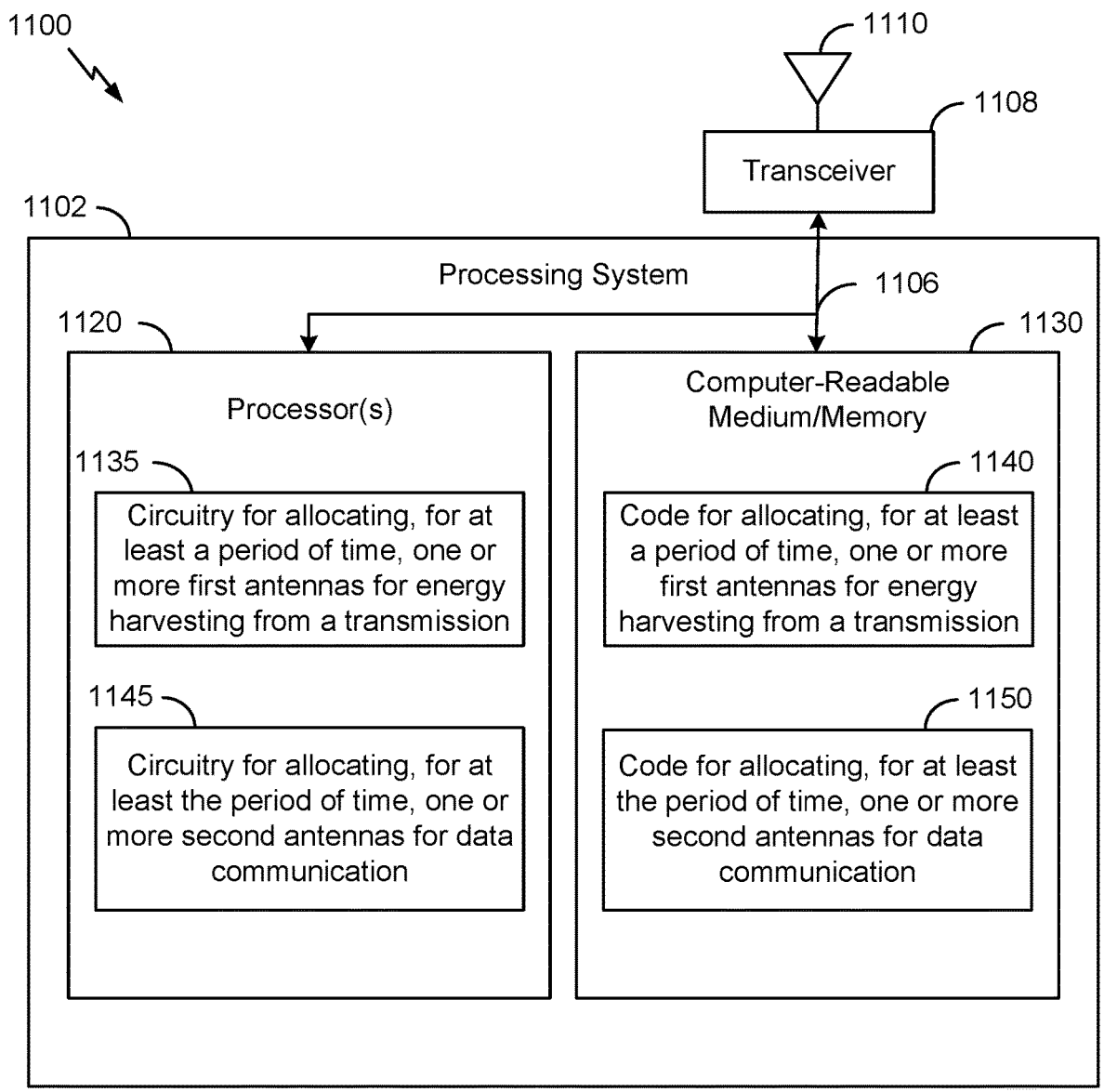
FIG. 11 is a diagram illustrating an example of an implementation of code and circuitry for a communications device, in accordance with the present disclosure.

In one aspect, method 900, or any aspect related to it, may be performed by an apparatus, such as communications device 1100 of FIG. 11, which includes various components operable, configured, or adapted to perform the method 900. Communications device 1100 is described below in further detail.

Note that FIG. 9 is just one example of a method, and other methods including fewer, additional, or alternative steps are possible consistent with this disclosure.

Figure 10:
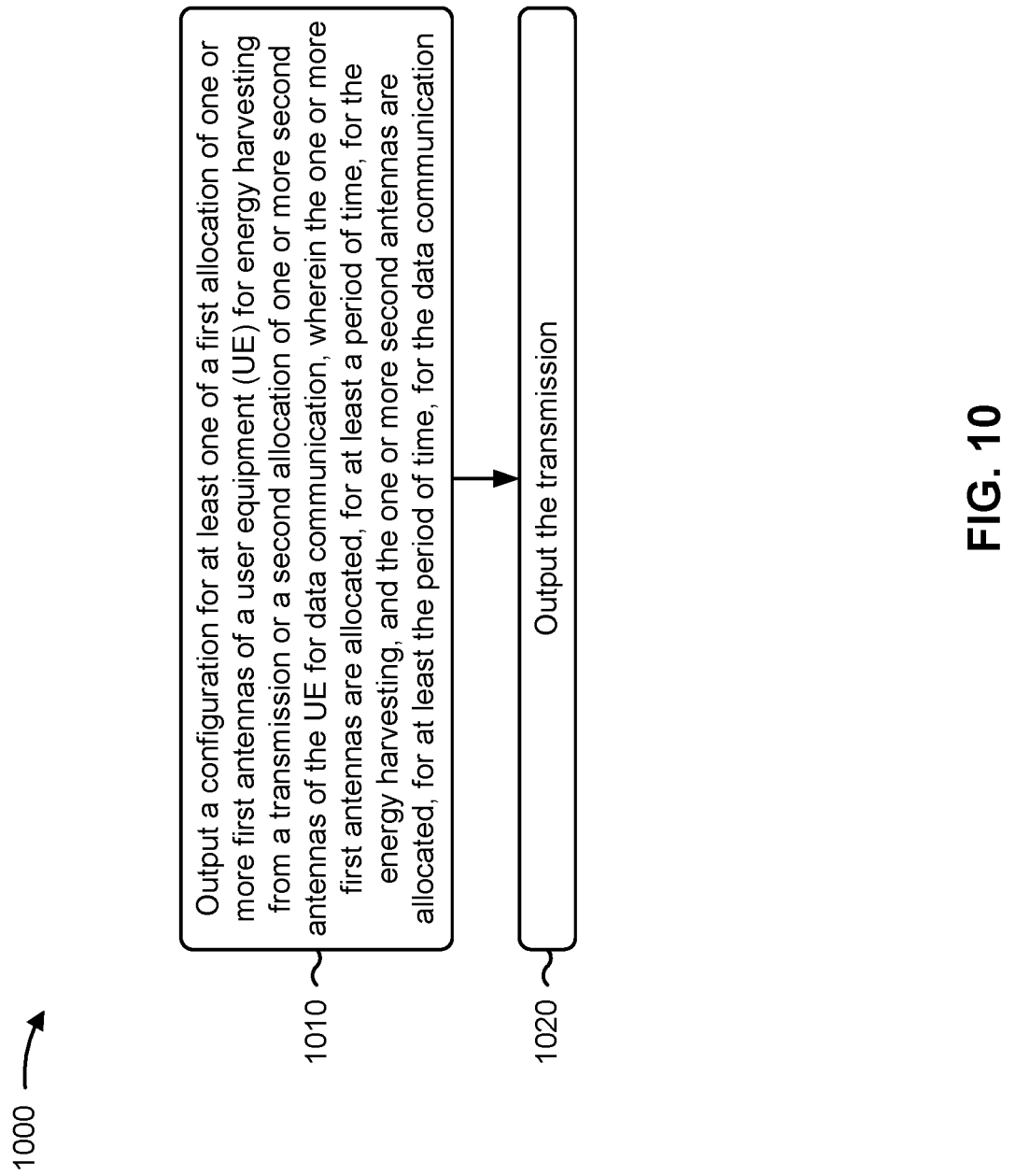
FIG. 10 shows a method for wireless communications by a network entity, in accordance with the present disclosure.

FIG. 10 shows a method 1000 for wireless communications by a network entity, such as BS 110, or a disaggregated base station as discussed with respect to FIG. 3.

Method 1000 begins at step 1010 with outputting a configuration for at least one of a first allocation of one or more first antennas of a UE for energy harvesting from a transmission or a second allocation of one or more second antennas of the UE for data communication, wherein the one or more first antennas are allocated, for at least a period of time, for the energy harvesting, and the one or more second antennas are allocated, for at least the period of time, for the data communication.

Method 1000 then proceeds to step 1020 with outputting the transmission.

In a first aspect, method 1000 includes obtaining an indication of information relating to a maximum quantity of antennas allocable for the data communication.

In a second aspect, outputting the configuration includes outputting a configuration for a quantity or range of quantities of the one or more second antennas.

In a third aspect, the one or more second antennas are a first set of a plurality of sets of antennas allocable for the data communication.

In a fourth aspect, method 1000 includes obtaining a request to adjust at least one of a quantity of the one or more first antennas or a quantity of the one or more second antennas, wherein outputting the configuration includes outputting a configuration for at least one of an increase in the quantity of the one or more first antennas or a decrease in the quantity of the one or more second antennas.

In a fifth aspect, method 1000 includes obtaining a request to adjust at least one of a quantity of the one or more first antennas or a quantity of the one or more second antennas, wherein outputting the configuration includes outputting a configuration for at least one of a decrease in the quantity of the one or more first antennas or an increase in the quantity of the one or more second antennas.

In a sixth aspect, outputting the configuration includes outputting the configuration based on a location of the UE.

Figure 12:
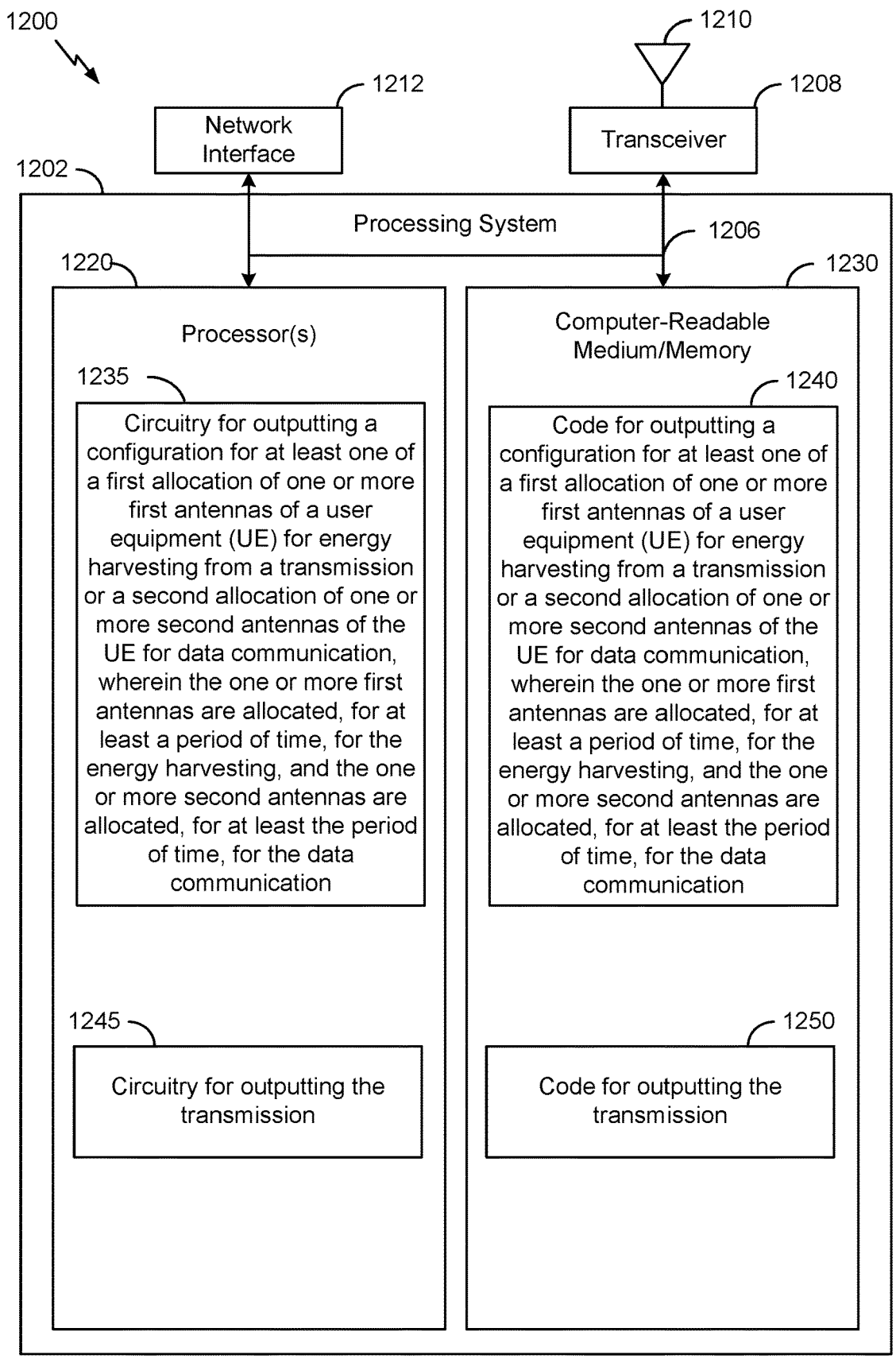
FIG. 12 is a diagram illustrating an example of an implementation of code and circuitry for a communications device, in accordance with the present disclosure.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are possible consistent with this disclosure.

FIG. 11 is a diagram illustrating an example of an implementation of code and circuitry for a communications device 1100, in accordance with the present disclosure. The communications device 1100 may be a UE, or a UE may include the communications device 1100.

The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes one or more processors 1120. In various aspects, the one or more processors 1120 may be representative of one or more of receive processor 258, transmit processor 264, TX MIMO processor 266, and/or controller/processor 280, as described with respect to FIG. 2. The one or more processors 1120 are coupled to a computer-readable medium/memory 1130 via a bus 1106. In various aspects, the computer-readable medium/memory 1130 may be representative of memory 282, as described with respect to FIG. 2. In certain aspects, the computer-readable medium/memory 1130 is configured to store instructions (e.g., computer-executable code, processor-executable code) that when executed by the one or more processors 1120, cause the one or more processors 1120 to perform the method 900 described with respect to FIG. 9, or any aspect related to it. Note that reference to a processor performing a function of communications device 1100 may include one or more processors performing that function of communications device 1100.

As shown in FIG. 11, the communications device 1100 may include circuitry for allocating, for at least a period of time, one or more first antennas for energy harvesting from a transmission (circuitry 1135).

As shown in FIG. 11, the communications device 1100 may include, stored in computer-readable medium/memory 1130, code for allocating, for at least a period of time, one or more first antennas for energy harvesting from a transmission (code 1140).

As shown in FIG. 11, the communications device 1100 may include circuitry for allocating, for at least the period of time, one or more second antennas for data communication (circuitry 1145).

As shown in FIG. 11, the communications device 1100 may include, stored in computer-readable medium/memory 1130, code for allocating, for at least the period of time, one or more second antennas for data communication (code 1150).

Various components of the communications device 1100 may provide means for performing the method 900 described with respect to FIG. 9, or any aspect related to it. For example, means for transmitting, sending, or outputting for transmission may include the transceiver(s) 254 and/or antenna(s) 252 of the UE 120 and/or transceiver 1108 and antenna 1110 of the communications device 1100 in FIG. 11. Means for receiving or obtaining may include the transceiver(s) 254 and/or antenna(s) 252 of the UE 120 and/or transceiver 1108 and antenna 1110 of the communications device 1100 in FIG. 11.

FIG. 11 is provided as an example. Other examples may differ from what is described in connection with FIG. 11.

FIG. 12 is a diagram illustrating an example of an implementation of code and circuitry for a communications device 1200, in accordance with the present disclosure. The communications device 1200 may be a network entity (such as BS 110 or a disaggregated base station as described with regard to FIG. 3), or a network entity may include the communications device 1200.

The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The network interface 1212 is configured to obtain and send signals for the communications device 1200 via communications link(s), such as a backhaul link, midhaul link, and/or fronthaul link as described herein, such as with respect to FIG. 3. The processing system 1202 may be configured to perform processing functions for the communications device 1200, including processing signals received and/or to be transmitted by the communications device 1200.

The processing system 1202 includes one or more processors 1220. In various aspects, the one or more processors 1220 may be representative of one or more of receive processor 238, transmit processor 220, TX MIMO processor 230, and/or controller/processor 240, as described with respect to FIG. 2. The one or more processors 1220 are coupled to a computer-readable medium/memory 1230 via a bus 1206. In various aspects, the computer-readable medium/memory 1230 may be representative of memory 242, as described with respect to FIG. 2. In certain aspects, the computer-readable medium/memory 1230 is configured to store instructions (e.g., computer-executable code, processor-executable code) that when executed by the one or more processors 1220, cause the one or more processors 1220 to perform the method 1000 described with respect to FIG. 10, or any aspect related to it. Note that reference to a processor performing a function of communications device 1200 may include one or more processors performing that function of communications device 1200.

As shown in FIG. 12, the communications device 1200 may include circuitry for outputting a configuration for at least one of a first allocation of one or more first antennas of a UE for energy harvesting from a transmission or a second allocation of one or more second antennas of the UE for data communication, wherein the one or more first antennas are allocated, for at least a period of time, for the energy harvesting, and the one or more second antennas are allocated, for at least the period of time, for the data communication (circuitry 1235).

As shown in FIG. 12, the communications device 1200 may include, stored in computer-readable medium/memory 1230, code for outputting a configuration for at least one of a first allocation of one or more first antennas of a UE for energy harvesting from a transmission or a second allocation of one or more second antennas of the UE for data communication, wherein the one or more first antennas are allocated, for at least a period of time, for the energy harvesting, and the one or more second antennas are allocated, for at least the period of time, for the data communication (code 1240).

As shown in FIG. 12, the communications device 1200 may include circuitry for outputting the transmission (circuitry 1245).

As shown in FIG. 12, the communications device 1200 may include, stored in computer-readable medium/memory 1230, code for outputting the transmission (code 1250).

Various components of the communications device 1200 may provide means for performing the method 1000 described with respect to FIG. 10, or any aspect related to it. For example, means for transmitting, sending, or outputting for transmission may include the transceiver(s) 232 and/or antenna(s) 234 of the BS 110 and/or transceiver 1208 and antenna 1210 of the communications device 1200 in FIG. 12. Means for receiving or obtaining may include the transceiver(s) 232 and/or antenna(s) 234 of the BS 110 and/or transceiver 1208 and antenna 1210 of the communications device 1200 in FIG. 12.

FIG. 12 is provided as an example. Other examples may differ from what is described in connection with FIG. 12.

The following provides an overview of some Aspects of the present disclosure:

Aspect 1: A method of wireless communication performed by a UE, comprising: allocating, for at least a period of time, one or more first antennas for energy harvesting from a transmission; and allocating, for at least the period of time, one or more second antennas for data communication.

Aspect 2: The method of Aspect 1, wherein an initial quantity of the one or more second antennas is a default quantity.

Aspect 3: The method of any of Aspects 1-2, wherein an initial quantity of the one or more second antennas is a configured quantity.

Aspect 4: The method of any of Aspects 1-3, further comprising: transmitting an indication of information relating to a maximum quantity of antennas allocable for the data communication.

Aspect 5: The method of Aspect 4, further comprising: transmitting, based on an amount of harvested energy, an indication of information relating to an adjusted maximum quantity of the antennas allocable for the data communication.

Aspect 6: The method of any of Aspects 1-5, further comprising: receiving an indication of a configured quantity or a configured range of quantities of the one or more second antennas.

Aspect 7: The method of any of Aspects 1-6, further comprising: receiving an indication of one or more of a modulation scheme for the data communication, an impedance switching frequency for the data communication, a modulation order for the data communication, a coding scheme for the data communication, or a coding rate for the data communication.

Aspect 8: The method of any of Aspects 1-7, wherein the one or more second antennas are a first set of a plurality of sets of antennas allocable for the data communication.

Aspect 9: The method of Aspect 8, wherein the first set is selected for allocation based on a target signal-to-noise ratio of the data communication.

Aspect 10: The method of any of Aspects 1-9, further comprising: transmitting a request to adjust at least one of a quantity of the one or more first antennas or a quantity of the one or more second antennas; and receiving, in accordance with the request, an indication to adjust the at least one of the quantity of the one or more first antennas or the quantity of the one or more second antennas.

Aspect 11: The method of Aspect 10, wherein transmitting the request includes: transmitting a request to perform at least one of increasing the quantity of the one or more first antennas or decreasing the quantity of the one or more second antennas.

Aspect 12: The method of Aspect 11, wherein transmitting the request includes: transmitting the request in accordance with an amount of energy of the UE being below a first threshold and an energy-consumption-to-harvesting ratio being above a second threshold.

Aspect 13: The method of Aspect 10, wherein transmitting the request includes: transmitting a request to perform at least one of decreasing the quantity of the one or more first antennas or increasing the quantity of the one or more second antennas.

Aspect 14: The method of Aspect 13, wherein transmitting the request includes: transmitting the request in accordance with an amount of energy of the UE being above a first threshold and an energy-consumption-to-harvesting ratio being below a second threshold.

Aspect 15: The method of any of Aspects 1-14, wherein allocating the one or more first antennas and allocating the one or more second antennas includes: allocating the one or more first antennas and allocating the one or more second antennas based on a location of the UE.

Aspect 16: The method of Aspect 15, wherein allocating the one or more first antennas and allocating the one or more second antennas includes: allocating the one or more first antennas and allocating the one or more second antennas based on a distance between the UE and a network entity.

Aspect 17: The method of Aspect 16, wherein allocating the one or more first antennas and allocating the one or more second antennas includes: allocating the one or more first antennas and allocating the one or more second antennas based on a positioning reference signal measurement.

Aspect 18: The method of Aspect 16, wherein allocating the one or more first antennas and allocating the one or more second antennas includes: allocating the one or more first antennas and allocating the one or more second antennas based on a navigation system.

Aspect 19: The method of any of Aspects 1-18, wherein the UE is a passive UE.

Aspect 20: The method of any of Aspects 1-19, wherein the UE is an energy-harvesting-enabled UE.

Aspect 21: The method of any of Aspects 1-20, further comprising: harvesting energy from the transmission via the one or more first antennas during at least the period of time; and performing the data communication via the one or more second antennas during at least the period of time.

Aspect 22: A method of wireless communication performed by a network entity, comprising: outputting a configuration for at least one of a first allocation of one or more first antennas of a UE for energy harvesting from a transmission or a second allocation of one or more second antennas of the UE for data communication, wherein the one or more first antennas are allocated, for at least a period of time, for the energy harvesting, and the one or more second antennas are allocated, for at least the period of time, for the data communication; and outputting the transmission.

Aspect 23: The method of Aspect 22, further comprising: obtaining an indication of information relating to a maximum quantity of antennas allocable for the data communication.

Aspect 24: The method of any of Aspects 22-23, wherein outputting the configuration includes: outputting a configuration for a quantity or range of quantities of the one or more second antennas.

Aspect 25: The method of any of Aspects 22-24, wherein the one or more second antennas are a first set of a plurality of sets of antennas allocable for the data communication.

Aspect 26: The method of any of Aspects 22-25, further comprising: obtaining a request to adjust at least one of a quantity of the one or more first antennas or a quantity of the one or more second antennas, wherein outputting the configuration includes: outputting a configuration for at least one of an increase in the quantity of the one or more first antennas or a decrease in the quantity of the one or more second antennas.

Aspect 27: The method of any of Aspects 22-26, further comprising: obtaining a request to adjust at least one of a quantity of the one or more first antennas or a quantity of the one or more second antennas, wherein outputting the configuration includes: outputting a configuration for at least one of a decrease in the quantity of the one or more first antennas or an increase in the quantity of the one or more second antennas.

Aspect 28: The method of any of Aspects 22-27, wherein outputting the configuration includes: outputting the configuration based on a location of the UE.

Aspect 29: An apparatus for wireless communication at a device, comprising a processor; memory coupled with the processor; and instructions stored in the memory and executable by the processor to cause the apparatus to perform the method of one or more of Aspects 1-28.

Aspect 30: A device for wireless communication, comprising a memory and one or more processors coupled to the memory, the one or more processors configured to perform the method of one or more of Aspects 1-28.

Aspect 31: An apparatus for wireless communication, comprising at least one means for performing the method of one or more of Aspects 1-28.

Aspect 32: A non-transitory computer-readable medium storing code for wireless communication, the code comprising instructions executable by a processor to perform the method of one or more of Aspects 1-28.

Aspect 33: A non-transitory computer-readable medium storing a set of instructions for wireless communication, the set of instructions comprising one or more instructions that, when executed by one or more processors of a device, cause the device to perform the method of one or more of Aspects 1-28.

The foregoing disclosure provides illustration and description but is not intended to be exhaustive or to limit the aspects to the precise forms disclosed.

Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an ASIC, or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) for wireless communication, comprising:
   one or more memories; and
   one or more processors, coupled to the one or more memories, and configured to cause the UE to:
      allocate, for at least a period of time, one or more first antennas for energy harvesting from a transmission; and
      allocate, for at least the period of time, one or more second antennas for data communication, wherein the one or more second antennas are a first set of a plurality of sets of antennas allocable for the data communication, and wherein selection of the first set for allocation is based on a target signal-to-noise ratio of the data communication, and wherein a sum of a quantity of the one or more first antennas and a quantity of the one or more second antennas is greater than a total quantity of antennas of the UE.

2. The UE of claim 1, wherein an initial quantity of the one or more second antennas is a default quantity.

3. The UE of claim 1, wherein an initial quantity of the one or more second antennas is a configured quantity.

4. The UE of claim 1, wherein the one or more processors are further configured to cause the UE to:

transmit an indication of information relating to a maximum quantity of antennas allocable for the data communication.

5. The UE of claim 4, wherein the one or more processors are further configured to cause the UE to:

transmit, based on an amount of harvested energy, an indication of information relating to an adjusted maximum quantity of the antennas allocable for the data communication.

6. The UE of claim 1, wherein the one or more processors are further configured to cause the UE to:

receive an indication of a configured quantity or a configured range of quantities of the one or more second antennas.

7. The UE of claim 1, wherein the one or more processors are further configured to cause the UE to:

receive an indication of one or more of a modulation scheme for the data communication, an impedance switching frequency for the data communication, a modulation order for the data communication, a coding scheme for the data communication, or a coding rate for the data communication.

8. The UE of claim 1, wherein the one or more processors are further configured to cause the UE to:

transmit a request to adjust at least one of the quantity of the one or more first antennas or the quantity of the one or more second antennas; and receive, in accordance with the request, an indication to adjust the at least one of the quantity of the one or more first antennas or the quantity of the one or more second antennas.

9. The UE of claim 8, wherein the one or more processors, to transmit the request, are configured to cause the UE to:

transmit a request to perform at least one of increasing the quantity of the one or more first antennas or decreasing the quantity of the one or more second antennas.

10. The UE of claim 9, wherein the one or more processors, to transmit the request, are configured to cause the UE to:

transmit the request in accordance with an amount of energy of the UE being below a first threshold and an energy-consumption-to-harvesting ratio being above a second threshold.

11. The UE of claim 8, wherein the one or more processors are configured to cause the UE to:

transmit a request to perform at least one of decreasing the quantity of the one or more first antennas or increasing the quantity of the one or more second antennas.

12. The UE of claim 11, wherein the one or more processors, to transmit the request, are configured to cause the UE to:

transmit the request to perform at least one of decreasing the quantity of the one or more first antennas or increasing the quantity of the one or more second antennas in accordance with an amount of energy of the UE being above a first threshold and an energy-consumption-to-harvesting ratio being below a second threshold.

13. The UE of claim 1, wherein the UE is a passive UE or an energy-harvesting-enabled UE.

14. The UE of claim 1, wherein the one or more processors are further configured to cause the UE to:

harvest energy from the transmission via the one or more first antennas during at least the period of time; and perform the data communication via the one or more second antennas during at least the period of time.

15. The UE of claim 1, wherein the one or more first antennas are a plurality of first antennas for the energy harvesting from the transmission, and wherein the one or more second antennas are a plurality of second antennas for the data communication.

16. The UE of claim 1, wherein, to allocate the one or more first antennas, the one or more processors are configured to cause the UE to allocate the one or more first antennas for a first time window that includes the period of time, wherein, to allocate the one or more second antennas, the one or more processors are configured to cause the UE to allocate the one or more second antennas for a second time window that includes the period of time, and wherein the first time window and the second time window are different and overlap during the period of time.

17. A user equipment (UE) for wireless communication, comprising:

one or more memories; and one or more processors, coupled to the one or more memories, and configured to cause the UE to:

allocate, for at least a period of time, one or more first antennas for energy harvesting from a transmission; and allocate, for at least the period of time, one or more second antennas for data communication, wherein a sum of a quantity of the one or more first antennas and a quantity of the one or more second antennas is greater than a total quantity of antennas of the UE, wherein the one or more processors, to allocate the one or more first antennas and allocate the one or more second antennas, are configured to cause the UE to allocate the one or more first antennas and allocate the one or more second antennas based on a location of the UE.

18. The UE of claim 17, wherein the one or more processors, to allocate the one or more first antennas and allocate the one or more second antennas, are configured to cause the UE to:

allocate the one or more first antennas and allocate the one or more second antennas based on a distance between the UE and a network entity.

19. The UE of claim 18, wherein the one or more processors, to allocate the one or more first antennas and allocate the one or more second antennas, are configured to cause the UE to:

allocate the one or more first antennas and allocate the one or more second antennas based on a positioning reference signal measurement or a navigation system.

20. The UE of claim 17, wherein the one or more processors are further configured to cause the UE to:
   harvest energy from the transmission via the one or more first antennas during at least the period of time; and
   perform the data communication via the one or more second antennas during at least the period of time.

21. The UE of claim 17, wherein the UE is a passive UE or an energy-harvesting-enabled UE.

22. The UE of claim 17, wherein the one or more first antennas are a plurality of first antennas for the energy harvesting from the transmission, and wherein the one or more second antennas are a plurality of second antennas for the data communication.

23. The UE of claim 17,
   wherein, to allocate the one or more first antennas, the one or more processors are configured to cause the UE to allocate the one or more first antennas for a first time window that includes the period of time,
   wherein, to allocate the one or more second antennas, the one or more processors are configured to cause the UE to allocate the one or more second antennas for a second time window that includes the period of time, and
   wherein the first time window and the second time window are different and overlap during the period of time.

24. A network entity for wireless communication, comprising:
   one or more memories; and
   one or more processors, coupled to the one or more memories, configured to cause the network entity to:
      output a configuration for at least one of a first allocation of one or more first antennas of a user equipment (UE) for energy harvesting from a transmission or a second allocation of one or more second antennas of the UE for data communication,
         wherein the one or more first antennas are allocated, for at least a period of time, for the energy harvesting,
         wherein the one or more second antennas are allocated, for at least the period of time, for the data communication, and
         wherein a sum of a quantity of the one or more first antennas and a quantity of the one or more second antennas is greater than a total quantity of antennas of the UE; and
      output the transmission,
      wherein the one or more processors, to output the configuration, are configured to cause the network entity to output the configuration based on a location of the UE.

25. The network entity of claim 24, wherein the one or more processors are further configured to cause the network entity to:
   obtain an indication of information relating to a maximum quantity of antennas allocable for the data communication.

26. The network entity of claim 24, wherein the one or more processors, to output the configuration, are configured to cause the network entity to:
   output the configuration for a quantity or range of quantities of the one or more second antennas.

27. The network entity of claim 24,
   wherein the one or more processors are further configured to cause the network entity to obtain a request to adjust at least one of the quantity of the one or more first antennas or the quantity of the one or more second antennas,
   wherein the one or more processors, to output the configuration, are configured to cause the network entity to output the configuration for at least one of an increase in the quantity of the one or more first antennas or a decrease in the quantity of the one or more second antennas.

28. The network entity of claim 24,
   wherein the one or more processors are further configured to cause the network entity to obtain a request to adjust at least one of the quantity of the one or more first antennas or the quantity of the one or more second antennas,
   wherein the one or more processors, to output the configuration, are configured to cause the network entity to output the configuration for at least one of a decrease in the quantity of the one or more first antennas or an increase in the quantity of the one or more second antennas.

29. A network entity for wireless communication, comprising:
   one or more memories; and
   one or more processors, coupled to the one or more memories, configured to cause the network entity to:
      output a configuration for at least one of a first allocation of one or more first antennas of a user equipment (UE) for energy harvesting from a transmission or a second allocation of one or more second antennas of the UE for data communication,
         wherein the one or more first antennas are allocated, for at least a period of time, for the energy harvesting,
         wherein the one or more second antennas are allocated, for at least the period of time, for the data communication, and
         wherein a sum of a quantity of the one or more first antennas and a quantity of the one or more second antennas is greater than a total quantity of antennas of the UE,
         wherein the one or more second antennas are a first set of a plurality of sets of antennas allocable for the data communication, and
         wherein the first set for allocation is selectable based on a target signal-to-noise ratio of the data communication; and
      output the transmission.

* * * * *